(12) United States Patent
Wiggs

(10) Patent No.: US 7,832,220 B1
(45) Date of Patent: Nov. 16, 2010

(54) DEEP WELL DIRECT EXPANSION HEATING AND COOLING SYSTEM

(75) Inventor: B. Ryland Wiggs, Brentwood, TN (US)

(73) Assignee: Earth To Air Systems, LLC, Franklin, TN (US)

( * ) Notice: Subject to any disclaimer, the term of this patent is extended or adjusted under 35 U.S.C. 154(b) by 0 days.

(21) Appl. No.: 10/757,265

(22) Filed: Jan. 14, 2004

Related U.S. Application Data

(60) Provisional application No. 60/439,831, filed on Jan. 14, 2003.

(51) Int. Cl.
 *F25B 45/00* (2006.01)
(52) U.S. Cl. ............................. 62/77; 62/260
(58) Field of Classification Search ............ 62/77, 62/84, 129, 149, 260, 228.3, 468, 114, 115, 62/502; 165/45
See application file for complete search history.

(56) References Cited

U.S. PATENT DOCUMENTS

| | | | |
|---|---|---|---|
| 2,503,456 A | | 4/1950 | Smith |
| 3,099,140 A | * | 7/1963 | Leimbach ..................... 62/197 |
| 3,421,337 A | * | 1/1969 | Johannsen ..................... 62/115 |
| 3,872,682 A | * | 3/1975 | Shook ........................ 62/114 |
| 3,919,162 A | * | 11/1975 | Austin ....................... 523/145 |
| 4,094,356 A | * | 6/1978 | Ash et al. ................... 165/299 |
| 4,169,554 A | * | 10/1979 | Camp .......................... 126/610 |
| 4,224,805 A | * | 9/1980 | Rothwell ..................... 62/260 |
| 4,257,239 A | | 3/1981 | Partin et al. |
| 4,378,787 A | | 4/1983 | Fleischmann |
| 4,448,237 A | * | 5/1984 | Riley ............................ 165/45 |
| 4,544,021 A | * | 10/1985 | Barrett ........................ 165/45 |
| 4,596,520 A | * | 6/1986 | Arata et al. ................. 418/55.5 |
| 4,741,388 A | | 5/1988 | Kuroiwa ....................... 165/45 |
| 4,993,483 A | * | 2/1991 | Harris .......................... 165/45 |
| 5,214,932 A | * | 6/1993 | Abdelmalek ................ 62/238.4 |
| 5,245,836 A | * | 9/1993 | Lorentzen et al. ............. 62/174 |
| 5,388,419 A | * | 2/1995 | Kaye ........................... 62/160 |
| 5,461,876 A | | 10/1995 | Dressler ....................... 62/160 |
| 5,477,914 A | | 12/1995 | Rawlings |
| 5,507,315 A | * | 4/1996 | Parker .................... 137/625.43 |
| 5,533,355 A | | 7/1996 | Rawlings |
| 5,560,220 A | * | 10/1996 | Cochran ....................... 62/260 |
| 5,561,985 A | | 10/1996 | Cochran |
| 5,564,282 A | * | 10/1996 | Kaye ........................... 62/160 |
| 5,623,986 A | | 4/1997 | Wiggs ......................... 185/45 |

(Continued)

*Primary Examiner*—Mohammad M Ali
(74) *Attorney, Agent, or Firm*—Miller, Matthias & Hull

(57) ABSTRACT

A direct expansion geothermal heat exchange system including certain requisite heating/cooling load calculations, certain operational refrigerant pressures, refrigerant tubing design lengths in varying soils, refrigerant tubing sizing per ton of system design capacity, refrigerant tubing sizing at varying sub-surface installation depths, lowering refrigerant tubing into a borehole via rope, encasing the lower segment of refrigerant tubing within a solid encasement, providing a bar for rope attachment, using a winch to raise and lower refrigerant tubing, certain sizing of the compressor, certain air handler sizing, certain accumulator sizing, certain sizing of metering devices in the heating mode and in the cooling mode, parameters for charging the system, certain sizing of the receiver, utilizing certain grout for corrosion protection and for enhanced heat transfer, providing a fluid filled pipe within a borehole to contain accessible refrigerant tubing, providing a certain fluid fill for the pipe, one of providing a certain time delay on the low pressure cut off switch and of eliminating the switch, providing a certain oil separator return line location, and providing a certain amount of lubricating oil.

18 Claims, 5 Drawing Sheets

U.S. PATENT DOCUMENTS

| | | | |
|---|---|---|---|
| 5,651,265 A * | 7/1997 | Grenier | 62/260 |
| 5,671,608 A * | 9/1997 | Wiggs et al. | 62/260 |
| 5,706,888 A | 1/1998 | Ambs et al. | |
| 5,738,164 A * | 4/1998 | Hildebrand | 165/45 |
| 5,758,514 A * | 6/1998 | Genung et al. | 62/471 |
| 5,771,700 A * | 6/1998 | Cochran | 62/117 |
| 5,816,314 A | 10/1998 | Wiggs et al. | 165/45 |
| 5,934,087 A * | 8/1999 | Watanabe et al. | 62/126 |
| 5,937,934 A * | 8/1999 | Hildebrand | 165/45 |
| 5,941,238 A * | 8/1999 | Tracy | 126/641 |
| 5,946,928 A | 9/1999 | Wiggs | 62/260 |
| 6,212,896 B1 * | 4/2001 | Genung | 62/260 |
| 6,227,003 B1 | 5/2001 | Smolinsky | |
| 6,250,086 B1 * | 6/2001 | Cho et al. | 62/5 |
| 6,276,438 B1 * | 8/2001 | Amerman et al. | 165/45 |
| 6,293,108 B1 * | 9/2001 | Cho et al. | 62/5 |
| 6,319,410 B1 * | 11/2001 | Allington et al. | 210/634 |
| 6,354,097 B1 * | 3/2002 | Schuster | 62/186 |
| 6,390,183 B2 * | 5/2002 | Aoyagi et al. | 165/146 |
| 6,403,540 B1 * | 6/2002 | Richardson | 508/440 |
| 6,427,454 B1 * | 8/2002 | West | 62/93 |
| 6,450,247 B1 * | 9/2002 | Raff | 165/45 |
| 6,521,459 B1 * | 2/2003 | Schooley et al. | 436/61 |
| 6,574,978 B2 * | 6/2003 | Flynn et al. | 62/278 |
| 6,591,624 B1 * | 7/2003 | Hesse | 62/244 |
| 6,615,601 B1 | 9/2003 | Wiggs | 62/235.1 |
| 6,722,141 B2 * | 4/2004 | Ferris et al. | 62/77 |
| 6,732,542 B2 * | 5/2004 | Yamasaki et al. | 62/278 |
| 6,751,974 B1 * | 6/2004 | Wiggs | 62/260 |
| 6,892,522 B2 * | 5/2005 | Brasz et al. | 60/39.181 |
| 2002/0194862 A1 | 12/2002 | Komatsubara et al. | |

\* cited by examiner

US 7,832,220 B1

DEEP WELL DIRECT EXPANSION HEATING AND COOLING SYSTEM

CROSS-REFERENCES TO RELATED APPLICATIONS

This application is a Non-Provisional Utility application which claims benefit of co-pending U.S. Provisional Patent Application Ser. No. 60/439,831 filed Jan. 14, 2003, entitled "Deep Well Direct Expansion Heating and Cooling System" which is hereby incorporated by reference.

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to an improved sub-surface, or in-ground/in-water, direct expansion heat pump system incorporating a unique application and combination of sub-surface heat exchange tubing, of compressor sizing, of air handler sizing, of receiver sizing, of oil separator use and oil return location, of additional compressor lubricating oil, of accumulator sizing, of expansion device sizing, of utilizing a particular grout to protect against corrosive elements, of refrigerant operating pressures, and of refrigerant charging, for use in association with direct expansion heating/cooling systems, and in particular for use in association with any deep well direct expansion ("DWDX") heating/cooling system, or partial geothermal heating/cooling system, utilizing sub-surface heat exchange elements as a primary or supplemental source of heat transfer, together with a means of lowering and extracting the sub-surface components into and out of a well/borehole. A deep well direct expansion system (herein referred to as a "DWDX" system) is herein defined as a direct expansion system which utilizes sub-surface heat exchange tubing in excess of 100 feet deep. The present invention may also be utilized in direct expansion systems 100 feet, or less, in depth (near surface) with improved operational efficiency results.

Ground-source/water-source heat exchange systems typically utilize fluid-filled closed loops of tubing buried in the ground, or submerged in a body of water, so as to either absorb heat from, or to reject heat into, the naturally occurring geothermal mass and/or water surrounding the buried or submerged tubing. Water-source heating/cooling systems typically circulate, via a water pump, water, or water with antifreeze, in plastic polyethylene underground geothermal tubing so as to transfer heat to or from the ground, with a second heat exchange step utilizing a refrigerant to transfer heat to or from the water, and with a third heat exchange step utilizing an electric fan to transfer heat to or from the refrigerant to heat or cool interior air space.

Direct expansion ground source heat exchange systems, where the refrigerant transport lines are placed directly in the sub-surface ground and/or water, typically circulate a refrigerant fluid, such as R-22, in sub-surface refrigerant lines, typically comprised of copper tubing, to transfer heat to or from the sub-surface elements, and only require a second heat exchange step to transfer heat to or from the interior air space by means of an electric fan. Consequently, direct expansion systems are generally more efficient than water-source systems because they require less heat exchange steps and because no water pump energy expenditure is required. Additional benefits of a direct expansion type system over a water-source system are: copper tubing is a better heat conductor than most plastic tubing; the refrigerant fluid circulating within the copper tubing of a direct expansion system generally has a greater temperature differential with the surrounding ground than the water circulating within the plastic tubing of a water-source system; generally, less excavation and drilling is required with a direct expansion system and, correspondingly, installation costs are generally lower with a direct expansion system than with a water-source system.

While most in-ground/in-water heat exchange designs are feasible, various improvements have been developed intended to enhance overall system operational efficiencies. Various such design improvements are taught in: U.S. Pat. No. 5,623,986 to Wiggs; in U.S. Pat. No. 5,816,314 to Wiggs, et al.; U.S. Pat. No. 5,946,928 to Wiggs; U.S. Pat. No. 6,615,601 B1 to Wiggs; Wiggs' U.S. patent application Ser. No. 10/073,513; Wiggs' U.S. patent application Ser. No. 10/127,517; Wiggs' U.S. patent application Ser. No. 10/251,190; Wiggs' U.S. patent application Ser. No. 10/335,514; and Wiggs' U.S. patent application Ser. No. 10/616,701; the disclosures of all of which are incorporated herein by reference.

In direct expansion applications, supply and return refrigerant lines may be defined based upon whether they supply warmed refrigerant to the system's compressor and return hot refrigerant to the ground to be cooled, or based upon the designated direction of the hot vapor refrigerant leaving the system's compressor unit, which is the more common designation in the trade.

For purposes of this present invention, the more common definition in the trade will be utilized. Hence, supply and return refrigerant lines are herein defined based upon whether, in the heating mode, warmed refrigerant vapor is being returned to the system's compressor, after acquiring heat from the sub-surface elements, in which event the larger interior diameter, sub-surface, vapor/fluid line is the return line and evaporator, and the smaller interior diameter, sub-surface, liquid/fluid line, operatively connected from the interior air handler to the sub-surface vapor line, is the supply line; or whether, in the cooling mode, hot refrigerant vapor is being supplied to the larger interior diameter, sub-surface, vapor fluid line from the system's compressor, in which event the larger interior diameter, sub-surface, vapor/fluid line is the supply line and condenser, and the smaller interior diameter, sub-surface, liquid/fluid line is the return line, via returning cooled liquid refrigerant to the interior air handler, as is well understood by those skilled in the art. In the heating mode the ground is the evaporator, and in the cooling mode, the ground is the condenser.

Virtually all heat pump systems, including direct expansion heat pump systems, utilize a compressor, an interior heat exchange means, an exterior heat exchange means, thermal expansion devices, an accumulator, a receiver, and refrigerant transport tubing. Generally, most direct expansion systems are designed to utilize, and do utilize, conventionally sized equipment components. For example, a three ton conventional direct expansion system, designed to accommodate a three ton heating/cooling load as per ACCA Manuel J load calculations, or other similar design criteria, typically utilizes a 3 ton compressor, a 3 ton air handler (a common interior heat exchange means), a 3 ton design capacity sub-surface heat exchange means (often about 5 horizontal 100 foot long ¼" diameter refrigerant grade copper tubes per ton, a 3 ton metering device (typically one self-adjusting thermal expansion valve for each of the cooling and heating segments), a 3 ton accumulator, a 3 ton receiver (with various other receiver designs, claimed or utilized, based upon about a greater or a smaller size of the compressor tonnage size utilized, as explained in U.S. Pat. No. 5,946,928 to Wiggs, which is incorporated herein by reference), and standard 3 ton design refrigerant grade copper transport tubing of varying sizes, all as well understood by those skilled in the art, to and from the compressor unit, the heat exchange means, and the other system components.

Other design improvements for conventional near-surface, direct expansion, heating/cooling systems are also taught in the said U.S. Pat. No. 5,946,928 to Wiggs. Conventional direct expansion systems typically require a relatively large surface area of land within which to bury an array of heat exchange tubing, or require a relatively extensive surface area within which to locate a series of multiple boreholes typically only 50 to 100 feet deep. While for new residential construction on relatively large lots, such designs can be well suited. However, the large surface area excavation requirements are often not well suited for retrofit applications, and are usually not well suited for most commercial applications, due to restricted available land surface areas.

To overcome such conventional direct expansion system application shortcomings, designs have been developed to permit the installation of sub-surface heat exchange tubing in sub-surface tubing installed at depths of 100 feet, or more, such as those designs taught by Wiggs in various of the above-referenced patents and patent applications. However, testing has shown that to successfully operate a deep well direct expansion system with exceptionally high operational efficiencies, a good sub-surface heat exchange system alone is not enough. A unique combination of design load sizing, of heat pump component equipment sizing, of refrigerant tubing sizing, of refrigerant tubing lengths, of refrigerant operating pressures, of refrigerant charging, of additional refrigerant lubricating oil, and of oil separator use must also be employed. Otherwise, the system will be either not operate at all, or will operate at lower than potential optimum efficiencies. In any geothermal heating/cooling system, including a direct expansion system, the best possible operational efficiencies are a high design priority.

Consequently, a design and a means to provide an enhanced operationally efficient direct expansion heating/cooling system, and in particular such a deep well direct expansion ("DWDX") system with vertically oriented heat exchange tubing, which can eliminate large land surface area requirements, and which can be easily installed in both new construction and retrofit applications would be preferable. Further, a means to protect the sub-surface copper tubing from potentially corrosive elements, and an optional means to access direct expansion sub-surface refrigerant heat exchange tubing for repair work or for replacement purposes, without having to re-excavate or without having to re-drill a deep well, would also be preferable in some situations. The present invention provides a solution to these preferable objectives, as hereinafter more fully described.

BRIEF SUMMARY OF THE INVENTION

Testing has shown that a unique combination of direct expansion geothermal heat pump/heat exchange system designs and/or methods can provide exceptional direct expansion system operational efficiencies, particularly in a deep well direct expansion ("DWDX") application. All references to copper refrigerant transport tubing are to refrigerant grade copper tubing, which refrigerant grade copper tubing is well understood by those skilled in the art. All references to direct expansion equipment components, excepting sizing and unique applications, are to equipment components, the construction and operation of which are well understood by those skilled in the art. No detailed description of electrical power supplies and/or wiring is provided, as same are well understood by those skilled in the art.

It is an object of the present invention to further enhance and improve the efficiency of prior art direct expansion geothermal heat exchange systems by means of new system designs and/or design combinations and/or methods comprised of: certain heating/cooling load calculations; certain operational refrigerant pressures; refrigerant tubing design lengths in varying soils; refrigerant tubing sizing per ton of system design capacity; refrigerant tubing sizing at varying sub-surface installation depths; lowering refrigerant tubing into a borehole via rope; encasing the lower segment of refrigerant tubing lowered into a borehole within a solid encasement, or, alternatively, providing a bar for rope attachment; using an above-ground winch to raise and lower refrigerant tubing within a borehole; sizing the system's compressor at 90% of system maximum design tonnage load; sizing the system's air handler at 140% of the compressor's maximum design tonnage capacity; sizing the accumulator at 90% of system maximum design tonnage load; certain sizing of metering devices in the heating mode and in the cooling mode; charging the system within certain pressure and temperature parameters; sizing the receiver based upon the total refrigerant charge; utilizing Grout Mix 111 for protection from corrosive environments and for enhanced heat transfer efficiency; providing a fluid filled pipe within a borehole to contain accessible refrigerant tubing; providing a fluid, to fill the pipe, consisting of a mixture of at least 50% propylene glycol and the remainder of water; one of providing at least a 15 minute time delay on the low pressure cut off switch and of eliminating the low pressure cut off switch altogether; providing an oil separator return to one of the accumulator and the compressor's suction line; and providing a certain amount of extra compressor lubricating oil. The present invention teaches to accomplish the stated preferable objectives in a direct expansion geothermal heat exchange/heat pump system, and in particular in a deep well direct expansion {"DWDX"} application by means of unique system combinations and designs and/or methods, as follows:

1. When calculating heating/cooling loads, via ASHRAE design criteria, ACCA Manuel J load calculations, or other similar load design criteria, as are all well understood by those skilled in the art, heating/cooling load designs are typically calculated in tonnage design capacities, where 12,000 BTUs equal one ton of design capacity.

The potential for under-sizing direct expansion systems commonly exists because system sizes are typically calculated via ACCA Manual J heating and cooling design criteria, ASHRAE design criteria, or other similar load design criteria, based upon temperature factors which cover 97.5% of the heating/cooling hours, which is not intended to accommodate all heating and cooling loads.

Consequently, in order to avoid this common under-sizing potential, direct expansion systems must be sized to accommodate most all reasonably foreseeable conditions, pursuant to the following criteria, which criteria, even though known to exist and understood by those skilled in the art, is not generally followed in the direct expansion heating/cooling industry:

Heating design loads must be calculated utilizing the 99% Design Dry Bulb temperature as listed under column 5 of the Table 1 Climatic Conditions for the United States, in the ASHRAE Fundamentals Handbook. As the ETA system should always be furnished with a back-up, auxiliary, heating system, such as electric strip heat or a fossil fuel furnace, as is a common practice in the trade and is well understood by those skilled in the art, there is no requirement that the system be designed to cover the Medium of Annual Extremes Minimum Temperature, as listed under column 10.

Cooling design loads must be calculated utilizing the design temperature that is the greater of the 1% Design Dry Bulb temperature, as listed under column 6, or the Medium of Annual Extremes Maximum Temperature, as listed under column 10, of the Table 1 Climatic Conditions for the United States, in the ASHRAE Fundamentals Handbook.

Always calculate the direct system's design load, for direct expansion system sizing purposes, to the maximum of the greater of the heating and cooling design loads. Do not exceed a 200% greater heating to cooling design load or there will be a potential for short-cycling and low humidity removal in the cooling mode.

2. Generally, virtually all direct expansion systems previously installed have utilized R-22 refrigerant, often called via a "Freon" trade name, with system operational pressures typically in the 50 psi to 250 psi ranges. Such a refrigerant works well in near surface conditions, typically at depths of 100 feet or less. However, testing has shown that in order to obtain favorable operational results when sub-surface heat exchange tubing is inserted into deep wells beyond 100 feet in depth, a refrigerant with a greater operating pressure must be utilized so as to offset the negative effects of gravity when the system is operating in the cooling mode and the ground is the condenser, necessitating the upward return flow of liquid refrigerant against the force of gravity. Thus, to offset such adverse gravitational effect in the cooling mode of operation, testing has shown that, while a supplemental refrigerant pump may always be utilized, as disclosed in the aforesaid Wiggs' U.S. patent application Ser. No. 10/073,513, a simpler and more efficient means to overcome such adverse gravitational effects is to utilize refrigerants that operate at higher pressures as the depths of the copper heat exchange tubing increase.

For example, for direct expansion systems with heat exchange tubing located at depths ranging from 100 to 300 feet, a refrigerant with operational heating/cooling working pressures between approximately 80 psi and 405 psi should be utilized. This will eliminate the need for a supplemental refrigerant pump to offset the adverse effects of gravity in the cooling mode. An example of such a refrigerant, with operational working pressures between 80 psi and 405 psi is R-410A. Thus, for purposes of DWDX applications, all formulas and calculations will be based on the use of R-410A refrigerant and compatible equipment. Further, testing has shown that even direct expansion systems operating in near-surface conditions, with sub-surface heat exchange tubing located at depths of 100 feet or less, can benefit in operational efficiencies from the use of a refrigerant operating at a higher pressure than R-22, particularly when utilizing the designs as disclosed herein.

3. Various direct expansion system designs utilize various sub-surface heat exchange tubing design criteria, which criteria is commonly of one particular design per ton of system design capacity regardless of actual sub-surface soil/heat conductivity conditions. For example, one conventional design typically utilized five copper tubes, respectively of one-quarter inch diameter, 100 feet long, refrigerant grade tubing, horizontally spaced several inches apart, per ton of system design, regardless of soil type. However, the common practice in the direct expansion trade of using the same sub-surface heat exchange tubing design criteria, regardless of soil type, can lead to either actual system over-sizing or under-sizing, depending on the actual sub-surface soil type heat conductivity in British Thermal Units per foot.hour degree Fare height (BTUs/Ft.Hr. degree F.). Consequently, a design based upon actual sub-surface soil conditions encountered would be preferable, so as to avoid the under-sizing/over-sizing problems which could be otherwise encountered. Thus, testing has shown the following sub-surface refrigerant heat exchange refrigerant tubing design length formulas should be utilized, where feet per ton are based on system tonnage design size (100% of the maximum heating/cooling load, whichever is the greatest in the area of installation):

A minimum of 100 feet per ton of maximum system tonnage design when the heat exchange vapor line is within 95%, or greater, rock, where rock excludes pumice, obsidian, and all other porous rock that is not permanently water saturated.

A minimum of 110 feet per ton of maximum system tonnage design when the heat exchange vapor line is within 80%, or greater, rock, or is within permanently water saturated sand, where rock excludes pumice, obsidian, and all other porous rock that is not permanently water saturated.

A minimum of 125 feet per ton of maximum system tonnage design when the heat exchange vapor line is within approved soil, excluding soil containing 20%, or more, of clay and/or sand that is not permanently moist.

A minimum of 175 feet per ton of maximum system tonnage design when the heat exchange vapor line is within soil containing 20%, or more, of clay and/or sand that is not permanently moist.

4. So as to optimize system performance, testing has shown that certain refrigerant grade tubing sizing should be used to connect the interior equipment, such as the compressor unit and the air handler, with the exterior heat exchanger line sizing (the exterior heat exchanger lines are defined as the sub-surface un-insulated vapor refrigerant transport line and the corresponding sub-surface insulated liquid refrigerant transport line), as follows:

Interior Equipment to Exterior Heat Exchanger Line Sizing

For a 12,000 BTU through 30,000 BTU compressor size, use a ⅜ inch liquid line and a ¾ inch vapor line.

For a 36,000 BTU through 48,000 BTU compressor size, use a ½ inch liquid line and a ⅞ inch vapor line.

For a 54,000 BTU through 60,000 BTU compressor size, use a ½ inch liquid line and a 1 inch vapor line.

Note: Compressor size means compressor size, not system tonnage design size.

5. Further, so as to optimize system performance, testing has shown that certain heat exchanger refrigerant transport tubing line sizing should optimally be employed within a borehole when utilizing a borehole method of sub-surface heat transfer tubing installation, as follows:

Sub-Surface Heat Exchanger Line Sizing

For a 12,000 BTU through a 30,000 BTU compressor size, use one 3/8 inch Liquid Line ("LL") and one 3/4 inch Vapor Line ("VL") for all standard designs up to 125 feet per ton, with one exception.

The one exception occurs when any one borehole exceeds 300 feet in depth. In such event, two equally sized boreholes must be utilized as necessary so as not to exceed the 300 foot depth limitation per borehole, with each respective borehole utilizing one 3/8 inch Liquid Line ("LL") and one 3/4 inch Vapor Line ("VL").

For example, consider a 30,000 BTU compressor tonnage design size where 125 feet per ton is required. In this event, utilize two boreholes, with each respective, and equally sized, borehole containing a respective 3/8 inch LL and a respective 3/4 inch VL. Here, each respective borehole will be 157 feet deep (2.5 tons×125 feet=312.5 feet deep. 312.5 divided by two=157 feet deep each.

For a 36,000 BTU through 60,000 BTU compressor size, use two boreholes, with each respective, and equally sized, borehole containing a respective 3/8 inch LL and a respective 3/4 inch VL, with one exception.

The one exception occurs when any two boreholes, respectively exceed 300 feet in depth. In such event, three equally sized boreholes must be utilized as necessary so as not to exceed the 300 foot depth limitation per borehole, with each respective borehole utilizing one 3/8 inch Liquid Line ("LL") and one 3/4 inch Vapor Line ("VL").

For example, a 60,000 BTU compressor tonnage design size borehole system in 95%, or more, non-porous rock would utilize two boreholes which were respectively 250 feet deep each (5 tons×100 feet per ton=500 feet . . . 500 feet divided by two=250 feet per borehole) . . . The same 60,000 BTU system tonnage size design borehole system in standard, non-clay and non-dry sand, soil would require 125 feet per ton, or a total of 625 feet, which, divided into three, would consist of 209 feet per borehole, with a 3/8 inch LL and a 3/4 inch VL being used in each respective borehole.

6. Further, most all conventional, vertically oriented, direct expansion system sub-surface heat exchange refrigerant transport tubing is lowered into respective wells/boreholes by hand. However, when a DWDX system is employed, utilizing wells/boreholes in excess of 100 feet deep, the weight of the copper refrigerant transport tubing becomes too great to be reasonably managed via lowering the tubing into the deep well/borehole by hand.

Consequently, in a DWDX application, the refrigerant transport tubing, which may, or may not, have been pre-inserted into a containment watertight pipe, should be lowered into the well/borehole by means of a rope, such as a nylon rope, a polypropylene rope, a wire rope, a steel cable, or the like. The rope is attached to the lower base segment of the refrigerant transport tubing to be lowered into the well/borehole, with the rope being fed down into the borehole along with the refrigerant transport tubing during system installation. If necessary during system installation, the refrigerant transport tubing can be easily raised, and then re-lowered, by means of the rope attached to the lower end of the refrigerant transport tubing being inserted into the borehole.

The provision of a rope attached to the lower segment of the refrigerant transport tubing as a means to lower/extract the refrigerant transport tubing into/out of one of a borehole and a fluid filled containment pipe will materially assist in preventing otherwise potential damage to the refrigerant transport tubing being inserted into the borehole or pipe, as well as materially assist in preventing potential personal injury.

During system installation, a smooth surface rope guide, such as a two inch diameter rigid galvanized steel pipe, a small wheel, a wire rope thimble, or the like, should be placed and secured on the ground surface at the surface edge of the well/borehole (or at the surface edge of a steel or polyethylene pipe if the geothermal copper tubing is installed within a pipe), so as to provide a means to safely feed and guide the rope into/out of the borehole (or pipe) during system installation without chaffing the rope, and without the rope digging into the adjacent ground.

7. Preferably, so as to avoid refrigerant transport line damage to the refrigerant transport tubing as the weight increases upon lowering the assembly into the well/borehole, the lower 1 to 3 feet segment of the refrigerant transport tubing, which is typically copper tubing, should be encased in a solid encasement, with such solid encasement consisting of cured concrete or cement, or the like, prior to insertion into the well/borehole, and with the solid encasement preferably being contained within a one to three foot segment of a protective watertight pipe. The lower 1 to 3 feet of the refrigerant transport tubing should preferably be formed in a U-bend shape, whether or not the supply and the return refrigerant transport lines near the bottom of the well/borehole are the same size. A U-bend shape permits easy and non-restrictive refrigerant fluid flow as the refrigerant fluid travels from a downward to an upward flow. Preferably, the lower bottom end of the refrigerant transport tubing (which should preferably be composed of a U shaped bend, serving as a liquid/oil trap) should be comprised of a smaller diameter liquid refrigerant transport line coupled (the advantages of which are explained in the said and incorporated Wiggs' U.S. patent application Ser. No. 10/251,190), above the U-bend, to a larger diameter vapor refrigerant transport line, which should, at a minimum, all be encased within concrete, cement, or the like, with the concrete/cement preferably extending to a point at least one inch above the liquid line to vapor line coupling for structural integrity and support.

Generally, the U-bend portion of the refrigerant transport tubing at the bottom of the well/borehole should be encased within a solid encasement so as to protect it from damage as it is lowered into/extracted from the borehole.

A preferable and easy method of encasing the said refrigerant transport lines, including any insulation surrounding the liquid refrigerant transport line, is the place the lower segment (the lower 1 to 3 feet portion) of refrigerant transport tubing/line assembly into a 1 to 3 feet long pipe segment, which pipe segment has a sealed bottom, and then fill the remainder of the pipe's interior with concrete, letting the concrete cure before lowering the assembly into the well/borehole. If readily available, Grout Mix 111 should be utilized in lieu of concrete. Further, a steel bolt, or the like, may be inserted through the very bottom of the 1 to 3 feet pipe segment with the sealed bottom, being anchored to the pipe's bottom by means of washers and nuts on each side of the pipe's bottom wall, prior to insertion of the refrigerant transport lines and the concrete. The steel bolt, which will be protruding from the bottom of the entire assembly when the concrete has cured, serves as an excellent attachment point for the rope used to lower the assembly into the well/borehole. However, any such steel/metal bolt, or the like, must be isolated from the refrigerant transport tubing by an electrical non-conductive isolation means, such as a segment of concrete, a rubber pad, or the like, so as to prevent any potentially corrosive elements in the ground from traveling through the steel bolt to the refrigerant transport tubing. The 1 to 3 foot pipe segment with the refrigerant transport lines and concrete fill must be of a smaller outside diameter than the interior diameter of the well/borehole and/or watertight pipe into which it is to inserted and lowered.

Such a concrete encasement serves three important purposes. First, the encasement provides a solid attachment point for the rope to be used to lower the assembly into the hole, without damaging the refrigerant transport lines. Second, the encasement absorbs the abrasion of the lower portion of the assembly being lowered into the hole without damaging the critical refrigerant transport lines. Third, the encasement prevents the U-bend at the bottom of the refrigerant transport tubing from buckling under pressure of over 100 feet of copper once the assembly is resting on the bottom of the hole into which it was lowered.

The rope, which is attached to the bolt extending from the bottom of the assembly, is secured in place by means a washer and a nut, or the like, prior to lowering the assembly, with the refrigerant transport lines extending from the concrete being attached/coupled to the rest of the sub-surface refrigerant transport lines, into the hole. In the alternative, the rope may be attached to a net, or sling, around the base/bottom of the assembly.

In an alternative method, at least one segment of copper tubing can be affixed (by means of silver solder or rope/wires, or the like) at a right angle between the two sub-surface copper lines at a point within approximately six inches above the U-bend, but at a point within the approximate 3 feet lower segment in any event. A rope can be attached to this bar extending between the two copper lines, and the assembly can be inserted into a pipe, such as a PVC pipe or the like, and then filled with concrete or cement.

In borehole installations where potential damage to the U-bend is not a concern, and where base structural support is not required prior to final borehole grouting, a rope can simply be attached to the bar segment and the copper heat transfer tubing can be simply lowered into the borehole, and withdrawn as needed.

Providing one of a solid encasement around the lower segment of refrigerant transport tubing/lines to be lowered into one of a borehole and a pipe, and a bar affixed to the lower segment of the refrigerant transport tubing to be lowered into one of a borehole and a pipe for rope attachment, materially assists in preventing damage to the lower segment of the refrigerant transport tubing during system installation via preventing undue stress to, and/or preventing crimping of, the copper refrigerant transport tubing, which could otherwise occur if the rope used to lower the assembly was attached directly to the copper refrigerant transport tubing itself Further, in addition to preventing potential damage, additional and important strengthening is provided to the important lower segment, as well as a convenient and safe rope attachment point being provided. Additional strengthening is important at this lower segment, particularly in a DWDX application, as the weight of the copper above the lower segment could otherwise potentially bend or otherwise deform the lower segment of the copper refrigerant transport tubing.

8. An above-ground winch, or the like, positioned at the ground surface in working proximity to a borehole, is used to control the rope, secured to the lower segment of the copper refrigerant transport tubing/lines, used to lower/raise the entire sub-surface heat transfer copper refrigerant transport tubing assembly, which includes the insulated liquid line and the un-insulated vapor line, into/out of one of a borehole and a pipe. The use of a winch, hand operated or mechanically operated or the like, enables one to control the speed of the assembly's decent, to stop for servicing/attaching additional refrigerant transport line lengths, and to withdraw the assembly as needed. Upon completion of installation, when the sub-surface heat transfer refrigerant tubing has been inserted into a watertight pipe for potential future access, or into a non-solid grout mixture (such as a bentonite clay grout mixture or the like), the rope would remain attached to the bottom of the assembly, would be removed from the winch, and would be secured to an above-ground permanent attachment, such as a small post or the like, for access if ever needed for re-attachment to the winch and withdrawing the refrigerant transport tubing from the well/borehole.

Upon completion of installation, when the sub-surface heat transfer refrigerant tubing has been inserted into a borehole filled with a solid and permanent grout mixture, such as concrete, cement, or the like, the rope would simply be cut at the top of the borehole and abandoned. However, of course, prior to final grouting, the entire assembly could be raised for repair work should a final pressure test indicate a leak in one of the sub-surface lines.

9. Size the system's compressor tonnage design capacity less than the system load design capacity. Generally, the compressor tonnage design capacity should optimally be designed at 90% (plus or minus 5% of 100%) of the direct expansion system's maximum load tonnage design capacity, in the greater of the heating mode and the cooling mode. If there is greater than a 5% of 100% deviation, system high efficiency operational levels may be unacceptably compromised. If there is less than a 5% of 100% deviation, system design capacity may be unacceptably compromised.

Virtually all current direct expansion system designs utilize a single speed compressor. However, testing has shown that overall system operational efficiencies can be significantly improved via the optional use of at least a two-speed compressor. (A preferable two speed compressor is herein defined as a compressor where one speed is operating at full 100% BTU compressor design capacity output, and where a second speed is operating at 67% of full compressor design capacity output, plus or minus 2% of 100%.) This is because, among other factors, in a direct expansion heating/cooling system, the temperature differential between the sub-surface refrigerant temperature circulated within the sub-surface refrigerant transport tubing and the naturally occurring temperature of the ground is much greater in the cooling mode than in the heating mode. Thus, since the greater the temperature differential, the better the heat transfer, a direct expansion system can operate with greater efficiency and capacity in the cooling mode. Consequently, while the compressor should generally operate at high speed in the heating mode so as to provide the warmest possible heat, the compressor should generally operate at low speed in the cooling mode due to its increased efficiency and capacity, which testing has shown is about in the 37%, plus or minus 2% of 100%, range. Should operation in the low speed in the cooling mode fail to maintain the desired thermostat setting (typically within 1.5 degrees F., plus or minus 0.5 degrees F.) on an exceptionally hot day, the thermostat would be programmed to switch the compressor to the high speed cooling mode of operation, as is well understood by those skilled in the art, which would increase the capacity and should satisfy the thermostat.

Preferably, therefore, at least an optional two-speed compressor, with high speed (100%) and low speed (67%, plus or minus 2%) operational capacities as defined herein, would be utilized with the compressor's high speed designed for use in one of the heating mode and the cooling mode, and with the compressor's low speed designed for use in the cooling mode.

10. Size the interior heat exchanger (typically an air handler is comprised of finned copper tubing and an electric powered fan within an encasement, as is well understood by those skilled in the art) at a tonnage design capacity greater than the compressor tonnage design capacity. Generally, the interior heat exchanger tonnage capacity should be designed/sized at 140% (plus or minus 10% of 100%) of the maximum compressor tonnage design capacity (using either a single speed compressor, or using the full 100% maximum tonnage design capacity for a two speed compressor) for optimum efficiency results. Again, for the same reasons as explained for the system's compressor, overall system operational efficiencies can be significantly improved via use of at least a two-speed interior heat exchanger.

The most efficient results are obtained when at least a two speed interior heat exchanger is used in conjunction with at least a two speed compressor. Preferably, therefore, when at least a two speed compressor is utilized, at least a two-speed interior heat exchanger (air handler) will be utilized, with the air handler's low speed designed for the system's maximum heating load design capacity and with the air handler's high speed designed for the system's maximum cooling load capacity.

Further, so as to obtain optimum results with a direct expansion system, each respective air handler fan speed, measured in cubic feet per minute ("CFM"), designed for a two speed interior heat exchange means, should be designed between 350 CFM and 375 CFM in the heating mode, and between 425 CFM and 450 CFM in the cooling mode. If a single speed air handler is utilized, the operational CFM should be 400 CFM, plus or minus 25 CFM. 350 CFM to 375 CFM is herein defined as a low speed air handler designation, and 425 CFM to 450 CFM is herein defined as a high speed air handler designation.

Thus, for highly efficient direct expansion system operational results, provide an interior heat exchanger tonnage capacity designed at 140% (plus or minus 10% of 100%) of the maximum compressor tonnage design capacity; provide an interior heat exchanger, optionally comprised of an air handler, where the air handler provides 400 CFM, plus or minus 25 CFM, per ton of the maximum system tonnage design capacity for a single speed compressor operating in a reverse cycle mode (either one of an available heating mode and an available cooling mode, as is well understood by those skilled in the art); provide an interior heat exchanger, optionally comprised of an air handler, where the air handler provides 400 CFM, plus or minus 25 CFM, per ton of the maximum system tonnage design capacity for a single speed compressor operating in a reverse cycle mode, and provide an interior heat exchanger, optionally comprised of an air handler, where the air handler provides 350 CFM to 375 CFM per ton of the maximum system tonnage design capacity for an optional two speed compressor operating in the heating mode, and where the air handler provides 425 CFM to 450 CFM per ton of the maximum system tonnage design capacity for an optional two speed compressor operating in the cooling mode.

11. For optimum results, testing has demonstrated that the accumulator tonnage design capacity should optimally be designed at 90% (plus or minus 5% of 100%) of the direct expansion system's maximum load design capacity (in the greater of the heating mode and the cooling mode).

For example, if the maximum system design load calls for 26,700 BTUs, then one would utilize a 24,000 BTU accumulator, as 12,000 BTUs equal one ton of heating/cooling capacity. Various older and common direct expansion system designs routinely oversized the accumulator, by as much as 50% of the compressor's design load, in an effort to store excess liquid refrigerant when the system was operating in the heating mode without the use of a reciever. However, this created various problems. First, an oversized accumulator alone, absent a correctly sized receiver, would often fail to adequately service a reverse-cycle system with a significant refrigerant charge imbalance between the heating mode and the cooling mode. Second, over-sizing the accumulator in proportion to the system's compressor increased the likelihood of correspondingly over-sizing the oil return suction hole in the bottom of the vapor suction line running proximate to the interior bottom of the accumulator. Such an oversized hole could decrease system operational efficiencies as excessive amounts of liquid refrigerant could also be pulled directly into the compressor along with the oil.

12 Generally, refrigerant flow metering devices, such as a self-adjusting thermal expansion valve, a manually adjusting thermal expansion valve, or a single piston metering devices (which are all well understood by those skilled in the art) are utilized in most heat pump applications, including direct expansion heat pump applications. Any such refrigerant flow metering device would typically consist of either a pre-determined orifice sized device, or of a self-adjusting device, which would typically automatically self-adjust the amount of liquid refrigerant flow allowed to pass based upon at least one of pre-determined temperatures and pressures.

Also generally, the refrigerant flow metering devices used for the heating mode and for the cooling mode system operation are sized the same in any given conventional system design, including direct expansion heat pump applications. For example, in a typical 2 ton load design, reverse-cycle, direct expansion heat pump system, all refrigerant metering devices used are typically sized for a 2 ton operational capacity, which are operationally functional.

However, testing has shown that, in order to achieve higher than normal direct expansion system operational efficiencies, utilizing the design criteria taught herein, where the compressor size is 90% of the maximum system load design, where the interior heat exchange means (typically an interior air handler) is sized at 140%, plus or minus 10% of 100%, of the compressor design tonnage capacity, where a higher than the normal R-22 pressure refrigerant is utilized, and where the sub-surface, heat exchange, refrigerant transport tubing is installed at varying depths, specific refrigerant flow metering devices should be used, and unique refrigerant flow metering device sizing models must be utilized.

Specifically, when operating in the heating mode with a higher pressure refrigerant with properties similar to R-410A in a direct expansion system application, a single piston metering device (which contains a single piston with a hole bored through the center at a specified diameter), or a manually adjusting thermal expansion valve, should be utilized instead of a self-adjusting thermostatic expansion valve. Due to the length of the sub-surface heat transfer tubing, a self-adjusting valve, which is commonly used in traditional direct expansion system applications in the heating mode, tends to keep "hunting" for an optimum setting, thereby frequently creating significant operational efficiency swings and supply temperature swings. This "hunting" problem can be avoided by the use of either a single piston metering device or a manually adjusting thermal expansion valve, with the use of a single piston metering device being preferred because the exact size of the preferred expansion orifice can be provided absent the rough estimate guess work necessary when using a manually adjusting valve.

However, the use of a standard size single piston metering device, with a pin restrictor hole bore size as commonly designed to match the system design load capacity and/or the compressor capacity, alone is not enough. The pin restrictor's central hole bore must be within certain design parameters to achieve highly efficient operational results. These central hole bore sizing parameters have been determined via extensive testing, and vary at differing depths. The following single piston metering device pin restrictor (Aeroquip type) sizes (based on central hole bore size in inches) should be utilized in the heating mode, plus or minus a maximum of two (2) one thousandths of an inch (0.001) central hole bore size, within the following depth ranges:

Pin restrictors (Aeroquip type) should be sized via the following table for optimum results in the heating mode at normal operating temperatures in a direct expansion system utilizing a refrigerant with operating pressures the same as, or similar to, R-410A:

Maximum Heating Tonnage Design Pin Restrictor Bore Size (Inches)

0 to 50 feet (depth of borehole below compressor unit)

| | |
|---|---|
| 1.5 | 0.041 |
| 2 | 0.049 |
| 2.5 | 0.055 |
| 3 | 0.059 |
| 3.5 | 0.063 |
| 4 | 0.065 |
| 4.5 | 0.068 |
| 5 | 0.071 |

51 to 175 feet (depth of borehole below compressor unit)

| | |
|---|---|
| 2 | 0.047 |
| 2.5 | 0.052 |
| 3 | 0.056 |
| 3.5 | 0.060 |
| 1.5 | 0.039 |
| 4 | 0.062 |
| 4.5 | 0.065 |
| 5 | 0.067 |

176 to 300 feet (depth of borehole below compressor unit)

| | |
|---|---|
| 1.5 | 0.037 |
| 2 | 0.044 |
| 2.5 | 0.050 |
| 3 | 0.053 |
| 3.5 | 0.057 |
| 4 | 0.059 |
| 4.5 | 0.061 |
| 5 | 0.064 |

The smaller type pin restrictor, which will be utilized in most DWDX applications due to the use of multiple heat transfer refrigerant line sets with larger systems, is commonly an "Aeroquip" pin restrictor (typically used with Heil equipment, etc.). This pin restrictor, and its housing, is designed for coupling to a ⅜ inch O.D. refrigerant grade copper line.

The larger type pin restrictor is commonly a "Chatliff" pin restrictor (typically used with Carrier equipment, etc.). Additionally, an identically sized, and interchangeable, larger type pin restrictor is a "Byron" pin restrictor. This pin restrictor, and its housing, is designed for coupling to a ½ inch O.D. refrigerant grade copper line. Generally, if one must utilize a larger type pin restrictor, due to lack of availability of a smaller Aeroquip type in an emergency, the pin hole size may need to be increased one to two thousandths of an inch to provide operating results similar to those of the smaller Aeroquip pin design, as provided on the above Pin Restrictor Sizing Criteria. For example while a 0.059 inch Aeroquip pin size would be used for a 3 ton trench application, for the same application, a 0.060, or a 0.061 Chatliff pin size may be required.

The larger type pin restrictor should be used whenever there is a single ½ inch O.D. liquid line (as opposed to multiple ⅜ inch O.D. liquid lines) comprising the liquid line portion of the heat transfer refrigerant line set.

Generally, in the cooling mode, since the heat exchange tubing in the interior air handler is in relatively close proximity, a high refrigerant pressure (compatible with refrigerant pressures such as those of R-410A) self-adjusting thermostatic expansion valve can be satisfactorily used proximate to the interior heat exchange means (typically an air handler), as is well understood by those skilled in the art. However, to achieve optimum efficiency results in the cooling mode, the self adjusting thermostatic expansion valve ("SATXV") must be located proximate to the air handler and must be sized at 140% (plus or minus 10% of 100%) of the maximum compressor tonnage design capacity in the cooling mode. This sizing criteria once again differs from the common SATXV sizing criteria, as in virtually all common direct expansion system designs, the SATXV is sized to match the compressor's tonnage load design size, which size typically corresponds to the direct expansion system's tonnage design size.

Further, a single pin metering device may alternately and optionally be utilized in the cooling mode in lieu of a self adjusting thermostatic expansion valve. However, once again, common and standard size restrictor pin hole bores do not produce optimum results for a direct expansion system utilizing the design improvements as disclosed herein.

Thus, when optionally using a single piston metering device, situated proximate to the interior air handler in the cooling mode, the following pin restrictor (Aeroquip type) sizing, based on central hole bore size in inches, should be utilized, plus or minus a maximum of two (2) one thousandths of an inch (0.001) central hole bore size, within the following depth ranges, Maximum Cooling Tonnage Design Pin Restrictor Bore Size (Inches)

0 to 50 feet (height of interior air handler above the compressor unit)

| | |
|---|---|
| 1.5 | 0.058 |
| 2 | 0.070 |
| 2.5 | 0.077 |
| 3 | 0.085 |
| 3.5 | 0.093 |
| 4 | 0.099 |
| 4.5 | 0.100 |
| 5 | 0.112 |

13. A unique system initial refrigerant charging and refrigerant charging step/method should be utilized where the system should be preferably filled/charged in the cooling mode (not in the heating mode), with the amount of refrigerant to achieve a maximum coefficient of performance ("COP"), within certain optimal head and suction system operational pressure ranges, and within certain refrigerant temperatures ranges, which materially differ from those used with conventional, near surface, R-22 refrigerant system designs. For example, when an R-22 compatible scroll compressor is utilized with a direct expansion heat pump system, the refrigerant charge in the cooling mode should be designed to produce a general operational refrigerant head pressure in the range of 225 psi, plus or minus 10%, and a general operational refrigerant suction pressure in the range of 85 psi, plus or minus 10%. In the heating mode, when a 2 ton compressor is utilized for example, the refrigerant charge should be designed to produce a general operational refrigerant head pressure in the range of 200 psi, plus or minus 10%, and a general operational refrigerant suction pressure in the range of 60 psi, plus or minus 10%. The maximum refrigerant charge, which will typically be in the cooling mode, will vary depending on the copper refrigerant transfer line sizes and lengths. Whereas, the optimum charge in the heating mode will generally range about 34% less, plus or minus 6% of 100%.

Correctly charging a direct expansion system is of extreme importance for actual, and for the most efficient, system operation. The lack of correct charging is likely one of the reasons prior efforts to develop a workable, reverse-cycle, direct expansion heating/cooling system, with sub-surface heat exchange tubing installed at depths greater than 100 feet, were not successful, as charging such a system in the heating mode and/or not providing enough refrigerant charge in the cooling mode could have rendered an unworkable reverse-cycle direct expansion system operation.

The best way to always ascertain the optimum charge is to add refrigerant to the operating system 5 or 10 pounds at a time and measure the system's COP or energy efficiency ratio ("EER") each time. When operational efficiencies begin to decrease, withdraw refrigerant to the operating system 1 pound at a time and measure the system's COP or EER each time. When the system's operational efficiency peaks and then decreases, add one more pound back in for an optimum charge. A similar optimum charging means can be further employed on a per ounce of refrigerant basis. Maintain a record of the optimum charge level for future servicing purposes.

When utilizing a refrigerant with greater working pressures than R-22 for operation within direct expansion system designed for operation at depths between 100 and 300 feet, such as an R-410A refrigerant, initially charge the system with approximately 10 pounds of R-410A per ton of system maximum design capacity in the greater of the heating mode and the cooling mode. Then, follow the 5 pound/1 pound/1 ounce procedure explained above until the system's peak efficiency performance is reached and refrigerant pressures and temperatures are within the following ranges:

Charge the refrigerant system in the cooling mode until the peak operational efficiency is reached and the superheat is within the 10 to 25 degree F. range; the head pressure is within the 305 to 405 PSI range; the liquid head pressure is within the 195 to 275 PSI range, which is similar to the head pressure range in the heating mode; the suction pressure is within the 80 to 160 PSI range; and the suction/vapor temperature is within the 37 degree to 55 degree F. temperature range.

14. Size the receiver to hold at least 40% of the maximum direct expansion system operational refrigerant charge. Generally, the receiver should hold at least 40% of 10 pounds of R-410A per ton of the greater of the heating/cooling design capacity. For example, if there is a maximum two ton system design load capacity, the receiver should hold at least 8 pounds of refrigerant (40% of 20 pounds equals 8 pounds).

The correct receiver sizing should not be based upon the system tonnage design load size and/or upon the compressor design size, as in prior uses and claims which were based upon other system design criteria. For example, in prior uses and claims, a two ton system direct expansion system load design and/or a two ton compressor design size may call for a 50% smaller receiver (a one ton receiver), or, in some applications, for a 50% larger receiver (a three ton receiver). However, basing the receiver sizing on the system's tonnage design size and/or on the compressor design size can lead to receiver sizing errors in direct expansion system applications where exterior and sub-surface refrigerant transport line lengths and sizes vary, and where expansion device locations vary. Consequently, in order to more accurately design the correctly sized receiver, the receiver sizing for a direct expansion system, and particularly for a DWDX system, should be based upon a percentage of the total amount of refrigerant charge required to operate the system at its peak operational efficiency level, as disclosed above.

15. Most conventional water-source and direct expansion systems installed within boreholes utilize a grout mixture to fill the void areas between the heat conductive, fluid-filled, underground tubing and the surrounding earth. The most common grout mixture is comprised of various mixtures of water, bentonite clay, and sand, which produces a non-solid grout with a consistency similar to peanut butter. This grout is relatively easy to install with most conventional grouting pumps. Such grout reportedly tends to attract and retain water proximate to the polyethylene piping virtually always used to contain the water and anti-freeze circulating within a geothermal water-source heat pump. The elastic and water attraction/retention properties of bentonite clay grout mixes are typically preferred over other types of grouting.

During or about the 1990s, the U.S. Department of Energy Sciences and Technology, at Brookhaven National Laboratory in Upton, N.Y., developed a unique grout intended for water-source heat pump applications, which grout was designated "Cementitious Grout Mix 111". This grout primarily consists of a mixture of fine-grained silica sand, cement, water, and a superplasticizer to aid in ease of installation. The exact grout formula and mixing procedure is a matter of public record. However, this grout, as stated, was intended to enhance the heat transfer of water-source geothermal heat pump installations, which consistently circulate water, or water and anti-freeze, within underground plastic, polyethylene, pipes. Further, as the temperature differentials between the water circulating within the plastic pipes and the surrounding ground is generally always designed to be approximately 10 degrees F., Grout Mix 111 was primarily designed with these working parameters in mind. Grout Mix 111 cures as a solid, with less reported moisture content than a bentonite clay based grout upon initial system installation.

The advantage of utilizing this particular type of grout is reported to be a heat conductivity rate above that of bentonite grout mixtures. Grout Mix 111 reportedly has a heat conductivity rate of about 1 to 1.4 BTUs/Ft.Hr. degrees F., whereas various bentonite clay grout mixtures have a heat conductivity rate of about 0.7 to 0.9 BTUs/Ft.Hr. degrees F.

The disadvantages of using Grout Mix 111 are reported to be its more expensive cost, its inability to attract and retain water/moisture proximate to the polyethylene tubing, and the necessity to utilize more expensive, and less readily available, high pressure positive displacement grout pumps. Consequently, since heat transfer from the water to the ground was already inhibited by the use of polyethylene pipe, which only has a heat transfer rate of about 0.225 BTUs/ft.Hr. degrees F., since the attraction/retention of water/moisture proximate to the polyethylene tubing can be advantageous for heat transfer purposes, and since the heat transfer properties of Grout Mix 111 were only reportedly marginally better than certain bentonite clay mixtures, the vast majority of geothermal heating/cooling systems continue to utilize a bentonite clay grout mixture.

Various industry experts, including Ph.D.'s from the University of Alabama and from the University of South Dakota, recommend the use of bentonite clay grout over the Grout Mixture 111. Other industry experts advise against the use of Grout Mixture 111 for a direct expansion system application because of a potential adverse reaction with copper (as opposed to no adverse reaction with polyethylene); and because of potential copper expansion/contraction concerns within the cured and rigid grout 111 Mixture (due to the significantly greater temperature differentials between a water-source system with polyethylene tubing and a direct expansion system with copper tubing absent any buffering circulating water intermediary), which could result in non-heat-conductive air gaps and/or stress cracks and resulting refrigerant leaks in the sub-surface copper tubing. Thus, various industry experts recommend using a bentonite clay grout mixture with a direct expansion system because of its reported elasticity, its reported ability to attract/retain moisture, and its reported ability to expand and contract with the copper tubing.

However, unlike various conventional concrete/cement grouts which easily crack, Grout Mix 111 has proven to be crack resistant, which enables it to be utilized for a unique and unintended purpose in a direct expansion system, namely, it can provide a protective barrier against sub-surface soil conditions that could otherwise be corrosive to copper, such as sulfur water or soil conditions with a pH below 5.5 or above 11. This protective quality is not a concern for water-source geothermal heating/cooling systems using sub-surface polyethylene pipe, as such pipe generally does not crack and is resistant to most all sub-surface corrosive environments. Thus, the fact that a bentonite clay based grout tends to attract/retain moisture and is water permeable (subjecting it to direct exposure to infiltrating sulfur water and/or other corrosive elements) is of no concern for water-source systems utilizing polyethylene pipe, and is even perceived as an advantage over the relatively non-permeable Grout Mix 111 by various experts in the industry.

Thus, in spite of various adverse recommendations and concerns, an actual direct expansion system's sub-surface DWDX copper tubing was intentionally installed in a significant sub-surface sulfur water environment for the specific test purposes: of monitoring Grout Mix 111's ability to shield the copper tubing from corrosive effects of the sulfur water; of monitoring any potential copper in cement expansion/contraction stress cracks and/or air gaps affecting operational efficiencies; and of comparing operational efficiencies with a DWDX system installed in a similar sub-surface environment where the copper lines were surrounded by a bentonite clay grout mixture.

The testing has shown that the DWDX system installed within the Grout Mix 111 mixture obtained superior operational results, with none of the stated potential concerns materializing. The actual field testing has demonstrated that the grout Mix 111 can prevent adverse effects to copper tubing from exposure to sub-surface environments. Further, the inability of grout Mix 111 to attract moisture is more than offset by the relative inability of grout mix 111 to lose moisture, particularly in the high temperature/high stress conditions encountered by direct expansion sub-surface tubing when operating in the cooling mode. This translates into superior conductivity, and higher system operational efficiencies, under the widely varying temperature swings of a direct expansion system, which can see sub-surface vapor temperatures below 30 degrees F. in the winter, and above 200 degrees F. in the summer.

Therefore, even though Grout Mix 111 was not developed with direct expansion system applications in mind, and was not developed for purposes of providing protection against corrosive elements, as a result of actual and extensive field testing, the use of Grout Mix 111 is hereby disclosed as the best grouting material to use in conjunction with a direct expansion system application, and particularly for use in conjunction with a DWDX system application.

Consequently, a preferred means of installing the sub-surface refrigerant transport tubing in any conventional sub-surface direct expansion system application, and particularly in a DWDX application, would be a means: whereby all of the sub-surface refrigerant transport tubing (which is typically copper) would be protected from actual or potential sub-surface environments which would be corrosive to the sub-surface refrigerant transport tubing (generally soils with a ph level of 5.5 or less, or with a ph level of 11 or above, or soils in close proximity to septic systems and/or landfill drainage, or soils containing sulfur and/or sulfur water, or the like, can be corrosive to copper); whereby some initial heat dissipation buffer between the copper heat transfer tubing and the surrounding soil is provided (such as, for example, in clay geothermal surroundings where the heat generated and transferred through the sub-surface copper heat exchange tubing in a cooling mode operation tends to cause the clay to dry and pull away from the heat transfer tubing and thereby materially reduce system operational efficiencies); and whereby a sealed containment casing would be provided to retain any refrigerant and/or compressor oil which may escape into the sub-surface environment by reason of a leak in the sub-surface refrigerant transport tubing.

A means to accomplish all of these objectives would be to encase the sub-surface refrigerant tubing (including the insulation surrounding the liquid line), used for geothermal heat exchange purposes, within Grout Mix 111, which grout mix forms a relatively non-porous solid upon curing, which solid encasement is generally crack resistant. As is typical in grouting sub-surface heat exchange tubing, whether plastic tubing or copper tubing, the Grout Mix 111 would be supplied from the bottom of the borehole up to the top by means of a grout line, which line is slowly extracted from the borehole during the grouting process, so as to always maintain a grout level above the bottom supply end of the grout line, thereby eliminating any air gaps.

Whenever elements potentially corrosive to copper are encountered in the sub-surface environment, the sub-surface un-insulated vapor refrigerant transport copper tubing, as well as the sub-surface insulated liquid refrigerant transport copper tubing and its surrounding insulation, as well as all sub-surface copper couplings, should all be completely surrounded and encased by Grout Mix 111 after their insertion into a well/borehole and/or after their insertion into any other potentially copper corrosive subsurface environment. An example of another potentially copper corrosive sub-surface environment, other than a well/borehole, would consist of a sub-surface trench, or the like, where copper tubing would be buried as the tubing extended from the interior of a structure, such as a house, to the actual well/borehole used for geothermal heat exchange purpose.

An example of a preferred watertight protective covering would be a readily available plastic shrink wrap, which can be simply tightly wrapped around the un-insulated vapor line copper tubing, as well as wrapped around the insulation surrounding the liquid line copper tubing, as well as wrapped around all tubing couplings, by hand prior to insertion into the borehole and final grouting. Thin walled, clear and/or colored, plastic shrink wrap, does little to impair heat transfer, and will temporarily protect the copper vapor refrigerant transport line/tubing, as well as the insulation surrounding the copper liquid refrigerant transport liquid line/tubing, as well as all refrigerant line couplings and the U-bend at the bottom of the lines, from corrosive sub-surface conditions until the grout Mix 111 can be inserted as a permanent protective shield around the sub-surface copper lines. The wet Grout Mix 111, due to its heavy specific gravity, will displace any sulfur water, or any other corrosive type water/fluid surrounding the shrink wrapped and temporarily protected un-insulated copper heat transfer vapor line and the shrink wrapped and temporarily protected insulated copper liquid line within the borehole, until the Grout Mix 111 cures and provides a full and permanent protective shield.

16. A preferred means of a direct expansion system, and particularly a DWDX system, installation whereby the subsurface refrigerant transport tubing would be accessible for servicing without having to re-drill and/or re-trench and/or re-excavate in either a deep well or a near-surface application would be accomplished by means of first installing a pipe, or the like, next inserting the copper refrigerant tubing within the pipe, and then filling the pipe with a fluid, such as water or water and anti-freeze (such as propylene glycol), or a non-solid grout, or a gel, so as to eliminate all air gaps and provide a heat conductive medium. Heat conductive grouting, such as Grout Mix 111, a bentonite clay grout mixture, or the like (Grout Mix 111 would be the preferred grout), would be placed in the space between the pipe's outer wall and interior wall of the borehole and/or the surrounding ground. A steel and/or galvanized steel pipe would generally be preferred, as the heat conductivity of steel is far superior to that of polyethylene pipe. If corrosive sub-surface elements were encountered, the steel pipe should preferably be surrounded and encased with Grout Mix 111.

While a polyethylene pipe can always be used for such a purpose, due to its poor heat conductivity properties, the length of the pipe may have to be increased by a factor of twenty-five to fifty percent. One advantage in utilizing a polyethylene pipe would be its additional relative protection afforded to the interior copper lines from potential stray electrical currents. However, stray electrical currents are relatively easy to ascertain in the first instance, and, if found, can typically be easily eliminated. For example, an improperly grounded and/or faulty water well pump or underground electrical utility line could result in a stray electrical current.

A means to accomplish one or more of these preferable objectives when using a steel or a plastic watertight pipe (a watertight pipe has watertight pipe segment couplings, welded/fused, or sealed with pipe dope, and a sealed bottom) is to insert all subsurface geothermal heat exchange refrigerant transport tubing (also referred to herein as the insulated liquid refrigerant transport line, the un-insulated vapor refrigerant transport line, and all line/tubing couplings) into and within at least one watertight pipe (multiple pipes can be used for multiple lines or multiple line sets), which water-tight pipe is installed within a well/borehole to encase the subsurface geothermal heat exchange refrigerant transport tubing, which pipe is additionally filled with a heat conductive fill material, and which pipe is surrounded by an exterior heat conductive fill material, which exterior heat conductive fill material fills the space between the exterior of the pipe's wall and the interior wall of the well/borehole.

The geothermal heat exchange refrigerant transport tubing can be inserted into the pipe, which pipe has been pre-inserted into the pre-drilled well/borehole. Or in the alternative, the geothermal heat exchange refrigerant transport tubing can be pre-installed within the watertight pipe, and then the entire assembly can be lowered into the pre-drilled well/borehole. The assembly contained within the pipe should preferably include an insulated liquid refrigerant transport line, an un-insulated vapor refrigerant transport line, and a U-bend at the bottom end of the liquid line before the liquid line is coupled to the un-insulated vapor refrigerant transport line, as disclosed in Wiggs' U.S. patent application Ser. No. 10/251,190.

Providing an optional water-tight pipe installed within a well/borehole to hold and encase the subsurface geothermal heat exchange refrigerant transport tubing, which pipe is additionally filled with a heat conductive fill material, and which pipe is surrounded by an exterior heat conductive fill material, which exterior heat conductive fill material fills the space between the exterior of the pipe's wall and the interior wall of the well/borehole is a preferred means when accessibility to the geothermal heat exchange refrigerant transport tubing is desired.

The watertight pipe may be, and should preferably be, comprised of one of galvanized steel or polyethylene, for example. The use of PVC pipe for the sub-surface retention of direct expansion heat transfer lines should be avoided, as the high and low temperature extremes generated by the un-insulated copper heat transfer line can create stress cracks in PVC, resulting in sub-surface leaks of the water and/or anti-freeze fill within the pipe. Although polyethylene's heat transfer rate of 0.225 BTUs/Ft.Hr. degrees F. is significantly less than the heat transfer rate of steel, the heat transfer rate of polyethylene is still about 59% of the heat transfer rate of water, and is about 125% better than the heat transfer rate of dry sand. Thus, if installed within a sub-surface area with a heat transfer rate equal to, or less than, polyethylene, the use of such a plastic pipe would typically be preferred over steel because of its protective properties and lower cost.

While the various present direct expansion heat pump applications generally do not utilize a protective pipe encasement for their sub-surface refrigerant transport/heat transfer tubing because of heat transfer impairment and/or because of additional installation cost concerns, when sub-surface copper tubing accessibility is preferred without having to re-drill and/or re-excavate, a preferred system design would incorporate such protective pipe encasements. Further, because of potential stress cracks occurring over time due to the hot/cold nature of the refrigerant transport lines within the protective pipe, the pipe should preferably be comprised of at least one of steel, galvanized steel, and polyethylene. Testing has shown that PVC pipe can develop stress cracks over time. Thus, PVC pipe and the like, even though typically less expensive than steel pipe and polyethylene pipe, should not be used to encase the subsurface refrigerant transport/heat transfer tubing installed within a well/borehole, as stress cracks can result in leaks of the heat conductive fill material within the pipe.

When such a steel or plastic pipe is utilized, the copper refrigerant transport tubing (including the insulated liquid line) is inserted into the interior of the pipe, and the remainder of the pipe's interior is filled with a heat conductive fill material, such as a solid, a fluid, a gel, a grout, sand, concrete, cement, powdered limestone, or the like, so as to eliminate air gaps and to provide thermal conductivity to the wall of the pipe, for transfer to the surrounding sub-surface material. Preferably, the remainder of the pipe's interior is filled with a fluid, such as water and/or anti-freeze (such as propylene glycol), such as in a 50% water/50% propylene glycol mixture, or greater propylene glycol percentage, up to 100% of propylene glycol, so as to eliminate virtually all non-heat conductive air gaps. Further, by filling the remainder of the pipe's interior with one of a fluid and a gel, if the refrigerant transport copper tubing within the pipe ever needs to be serviced or replaced due to a concern, such as a refrigerant leak, the tubing can simply be withdrawn from the pipe and replaced, without the costly and time-consuming necessity of re-drilling the deep well/borehole.

While a water-tight pipe should preferably encase the sub-surface refrigerant transport lines of a direct expansion system to provide one or more of the advantages outlined above, only the portion of the pipe containing the actual heat transfer tubing needs to be filled with a heat conductive fill material such as a preferable fluid and/or gel.

The actual heat transfer tubing will typically consist of a liquid and of a vapor copper refrigerant transport line, where the liquid line is preferably insulated, within a well/borehole where geothermal heat transfer is intended. The refrigerant transport lines connecting the interior direct expansion equipment (such as the compressor, the accumulator, the receiver, the interior air handler, and the like) to the actual heat transfer tubing are referred to as connecting refrigerant transport lines. The connecting refrigerant transport lines are typically all insulated wherever exposed to the air. The connecting refrigerant transport lines should preferably be fully insulated and enclosed within a protective pipe, watertight or otherwise, whenever touching, or buried under, the ground on the way to the sub-surface heat transfer tubing segment, but there is no need to fill the remainder of such protective pipe, containing only the connecting refrigerant transport tubing and insulation, with a solid or a fluid or a gel, since heat transfer to the pipe's surroundings are unnecessary at this connecting segment portion.

For further clarification, while it is customary in the general heat pump trade, including the direct expansion heat pump trade, to insulate all interior refrigerant transport lines, it is also customary in the direct expansion heat pump trade to bury the exterior refrigerant transport lines extending from the interior geothermal direct expansion heating/cooling system, such as the compressor unit and the interior heat exchange means, to the geothermal heat exchange refrigerant lines, whether such geothermal heat exchange lines.

Typically, in the direct expansion heat pump trade, such exterior connecting refrigerant transport lines are buried about 1.5 to 4 feet deep, and are typically neither insulated nor provided with a protective watertight encasement. This typical exterior connecting refrigerant transport line installation method, neither including insulation nor including any protective encasement, presents several potential problems. First, the lines are exposed to very near surface (within 4 feet of the ground surface) conditions, which, even if below the frost line, are still relatively materially affected by changing above-ground atmospheric temperature conditions when compared to the relatively stable sub-surface conditions existing at greater depths. Thus, heat gains or losses effected by the geothermal heat exchange lines can be short-circuited by exposure to such very near-surface sub-surface conditions. Further, the possibility of exposure to corrosive sub-surface elements, as outlined above, always exists. Additionally, unprotected near-surface refrigerant connecting transport lines are more prone to damage by unrelated near-surface activity, such as gardening, installation of telephone or utility lines, and the like.

Thus, it is preferable to fully insulate all of the exterior connecting refrigerant transport lines, and then to fully encase all of the exterior and insulated connecting refrigerant transport lines within a protective watertight encasement, such as a pipe or the like, or such as a Grout Mix 111. When any such exterior connecting refrigerant transport lines are extended above the surface, all such lines should be fully insulated so as to avoid a short-circuiting heat transfer effect with adverse atmospheric temperature conditions, as is common in the trade.

17. The ability to utilize a mixture of 50% to 100% propylene glycol as a heat conductive fluid fill material within a steel or a polyethylene pipe also containing the system's sub-surface heat transfer refrigerant transport lines, in a heating mode application, is a unique design feature previously overlooked and unclaimed in a direct expansion application. Propylene glycol is a food-grade anti-freeze, which is reported to be environmentally safe, and which, in a 50% mixture with water will reportedly inhibit the water within the pipe from freezing, and potentially damaging the pipe's containment structural integrity, to a temperature of about 30 degrees below F, which is below the typical sub-freezing temperatures reached via the refrigerant traveling within the sub-surface copper, un-insulated, heat exchange tubing of a direct expansion heating system.

This particular advantageous 50% mixture of propylene glycol anti-freeze and water would be an efficiency detriment in a water-source geothermal system because as the anti-freeze gets colder, it gets thicker (like a syrup), and the increased density increases the power draw of the water source system's water circulating pump. This is one reason a water source geothermal heating/cooling system is only designed to accommodate an approximate 10 degree F. temperature differential, together with only an approximate 20% propylene glycol/80% water mixture, because, in the heating mode, as the anti-freeze/water mixture becomes thicker, even with only 20% propylene glycol, an approximate 15% power increase is exerted upon the water circulating pump in order to maintain the minimum requisite water to ground heat exchange circulation rate. If the said anti-freeze to water mixture was increased to a level greater than 20%/80%, the operational power requirements of the water pump would also increase, thereby decreasing overall heating system operational efficiencies.

However, in a DWDX application when a steel or a polyethylene pipe is utilized to contain the copper refrigerant transport tubing, this particular mixture of 50% propylene glycol/50% water can be advantageous, as, generally, when densities increase, heat conductivity rates increase. Thus, since a direct expansion application generally does not, and in this design would not, require the use of a water circulating pump, as the said anti-freeze became colder and thicker in the winter, the heat transfer ability, from the naturally occurring surrounding sub-surface material, through the antifreeze mixture to the refrigerant, circulating within the un-insulated copper vapor refrigerant line, would be increased, thereby enhancing heat transfer and operational efficiencies. Depending on the cost of propylene glycol versus enhanced heat transfer advantages in the heating mode, any mixture between 50% and 100% propylene glycol may be preferable.

Thus, when copper transfer tubing is preferred to be accessible and is inserted within a pipe in a borehole, or deep well, for a heating, or for a partial heating use application in a direct expansion system, the balance of the interior of the pipe should be filled with a 50%, or greater, mixture of propylene glycol, or the like, with the balance of the mixture consisting of water, or the like.

18. Either eliminate the system's compressor's low refrigerant pressure cut-off timing switch/device altogether, or adjust/design the system's compressor's low-pressure cut-off timing switch/device to deactivate the compressor only after a minimum continuous 15 minute period of below minimum requisite system refrigerant operational pressures.

A compressor's low-pressure cut-off switch/device, and the means to adjust the timing of same, is well understood by those skilled in the art. Typically, operating at relatively cool low-pressure situations for some extended time is not significantly harmful to a refrigerant compressor, as it otherwise could be if the compressor operated for some extended time under high-pressure situations. One primary purpose of a refrigerant compressor's automatic low-pressure cut-off switch/device is to stop system operation in the event of a refrigerant leak. In a DWDX system application in the cooling mode, due to the sub-surface depth of the refrigerant transfer lines, and depending on a variety of other conditions, it can periodically take from 2 to 15 minutes, for the system to fully operate at satisfactory design levels and pressures. In a DWDX system application in the heating mode, the system attains satisfactory operational design levels and pressures in less time than in the cooling mode. Consequently, the one minimum 15 minute low-pressure cut-off setting will typically cover both heating and cooling mode system operation in most all reverse-cycle direct expansion system applications.

The lack of a 15 minute minimum automatic refrigerant low-pressure cut-off delay is another reason various prior attempts to develop a successful DWDX application were unsuccessful, as various prior attempts were likely abandoned after several to 10 minutes of single, or successive delayed interval, attempts to reach satisfactory system operational refrigerant pressures.

However, while the above referenced minimum 15 minute delay criteria should be preferably utilized whenever a low-pressure cut-off device is desired, it would simply be preferable to totally eliminate the low pressure cut-off device in a direct expansion system application, and particularly in a DWDX system application, as the compressor's own internal protection devices (such as a sensor detecting too high a heat caused by compressor operation absent sufficient refrigerant cooling in the event of a refrigerant leak) will cut the compressor off should the compressor run in a low refrigerant pressure situation for too long a period. Thus, as the compressor has its own internal cut-off system, as is well understood by those skilled in the art, to account for situations which include operation at too low a pressure for too long a time, a secondary and separate low pressure cut-off switch is generally unnecessary in a direct expansion system.

19. Generally, the refrigerant oil within a DWDX system will be easily returned to the compressor when the system is operating in a cooling mode since it is mixed with the liquid refrigerant returning to the surface. Also, generally, due to the U-bend liquid trap/oil trap in the liquid line at the bottom of a DWDX system, before and below the point the liquid refrigerant transport line is coupled to the vapor refrigerant transport line near the bottom of the deep well/borehole, the refrigerant oil will be swept up to some extent with the vapor refrigerant returning to the surface when the system is operating in a heating mode. However, in the event satisfactory oil return is of concern in any DWDX system application, even in the event one elects to add additional refrigerant oil to enrich the oil content of the refrigerant, the use of an oil separator, with a design capacity sized to match the system's compressor's tonnage and refrigerant flow rate design, should be utilized so as to help insure the system's compressor remains appropriately lubricated. An oil separator is well understood by those skilled in the art, however, testing has proven an improved means of oil separator utilization in a direct expansion system application, as well as in any heat pump application, as follows:

Namely, while conventional oil separator designs call for the collected oil to be returned directly to the system's compressor, an improvement consists of returning the oil from an oil separator directly to one of the compressor's suction line prior to the accumulator and to the accumulator itself.

The purpose of the accumulator is to accumulate and retain any liquid refrigerant, giving the refrigerant time to vaporize prior to entry into the system's compressor so as to prevent compressor slugging and/or inefficient operation. Typically, accumulators have a small hole in the vapor intake tube which is located within, and proximate to the bottom of, the accumulator at one point, so as to suck in any oil that has settled at the bottom of the accumulator, and return the oil to the compressor, as is well understood by those skilled in the art. In this regard, it is important in a direct expansion system design, and particularly in a DWDX system application, that the accumulator match the actual compressor tonnage capacity design size, rather than match the direct expansion system tonnage design size, or rather than be intentionally over-sized in an attempt to store excess refrigerant resulting from a refrigerant charge imbalance in a reverse-cycle direct expansion system, as has been commonly done in conventional direct expansion system applications. Otherwise, the hole in the bottom of the vapor intake tube near the bottom of the accumulator will be either too small or too large.

Since the oil exiting the compressor and entering the oil separator has been superheated via the compression of the hot refrigerant vapor, the design improvement of directing the superheated oil into the accumulator, or into the suction line prior to the accumulator, serves to materially assist in vaporizing any accumulated liquid refrigerant, with the superheated oil being returned to the compressor via the small suction hole in the said vapor intake tube located within, and proximate to the bottom of, the accumulator.

20. Although the subject invention incorporates the use of an oil separator in a direct expansion system, and particularly in a DWDX application, the mere use of an oil separator is not enough to prevent potential long-term compressor oil starvation and pre-mature failure. This is because oil separators are not 100% efficient. The best oil separators only currently claim to be 98% to 99% efficient. This means some oil will always be lost to the sub-surface refrigerant transport tubing.

The use of an oil trap at the bottom of a borehole, as disclosed via the said Wiggs' U.S. patent application Ser. No. 10/251,190, helps to ensure oil return in conjunction with the liquid refrigerant in the cooling mode. However, since exceptionally long sub-surface heat transfer refrigerant transport tubes are utilized in virtually all direct expansion systems, as opposed to the rather condensed tubing within the finned exterior tubing of an air source heat pump, as is well understood by those skilled in the art, additional oil needs to be added to any direct expansion system, whether or not a DWDX design and/or an oil separator is utilized, in order to provide an adequately oil rich environment within the circulating refrigerant so as to ensure continuous adequate oil return to the compressor. Since some oil will generally always remain in the bottom of the sub-surface refrigerant tubing in a direct expansion system, and particularly in a DWDX system design, a small amount of additional oil needs to be added over and above the conventional amount sometimes added to systems with conventional extra-long exterior air source heat pump line sets, with such conventional additional amounts being well understood by those skilled in the art.

Thus, in any direct expansion system, the following formula should be utilized for the addition of extra oil, which extra oil for a system as disclosed herein, utilizing an R-410A type refrigerant, should be a polyolester type lubricant oil, and should not be the commonly used Suniso Refrigeration Oil 3GS used with all conventional direct expansion systems operating at lower refrigerant pressures with an R-22 type refrigerant:

Multiply the system charge in pounds of refrigerant by 2.2%, and multiply this number by 16 fl. oz. (1 pound). Subtract from this result 8% of the fluid ounces of oil shown on the compressor nameplate, and add the amount shown, if any, to the system's receiver and/or to the system's liquid line in the heating mode. Adding the extra oil to the suction line would initially overfill the compressor and/or oil separator.

As an example, if the system charge is 50 pounds of refrigerant, and the oil shown on the compressor nameplate is 108 fl. oz., then apply the formula as follows:

50×2.2%=1.1

×16=17.6

108×8%=8.64

17.6−8.64=8.96 fl. oz. of oil to be added.

Other customary direct expansion refrigerant system apparatus and materials would be utilized in a direct expansion system application, such as a reversing valve to change the direction of the refrigerant flow (except through the accumulator and compressor) when a reverse-cycle system is switched from a heating mode to a cooling mode and vice versa, distributors when multiple refrigerant lines are utilized, a thermostat, wiring, controls, refrigerant tube couplings, above-ground refrigerant transport line insulation (such as rubatex, or the like), and a power source, all of which are well-known to those skilled in the art and therefore are not all shown herein.

The subject invention may be utilized in whole, or in part, or by means of multiple units connected via headers/distributors, connecting sub-surface tubing in series or in parallel by means of common fluid supply and return refrigerant lines, to increase operational efficiencies and/or to reduce installation costs in a number of applications, such as in a deep well direct expansion system, or in a conventional geothermal direct expansion heat pump system, or as a supplement to a conventional air-source heat pump system, water source heat pump system, or other conventional heating/cooling system, as is well understood by those skilled in the art, and, therefore, are not shown herein. The invention may be utilized to assist in efficiently heating or cooling air by means of a forced air heating/cooling system, or to assist in efficiently heating or cooling water in a hydronic heating/cooling system, as is also well understood by those skilled in the art, and, therefore is not shown herein.

BRIEF DESCRIPTION OF THE SEVERAL VIEWS OF THE DRAWINGS

There are shown in the drawings embodiments of the invention as presently preferred. It should be understood, however, that the invention is not limited to the precise arrangements and instrumentalities shown.

DETAILED DESCRIPTION OF THE INVENTION

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
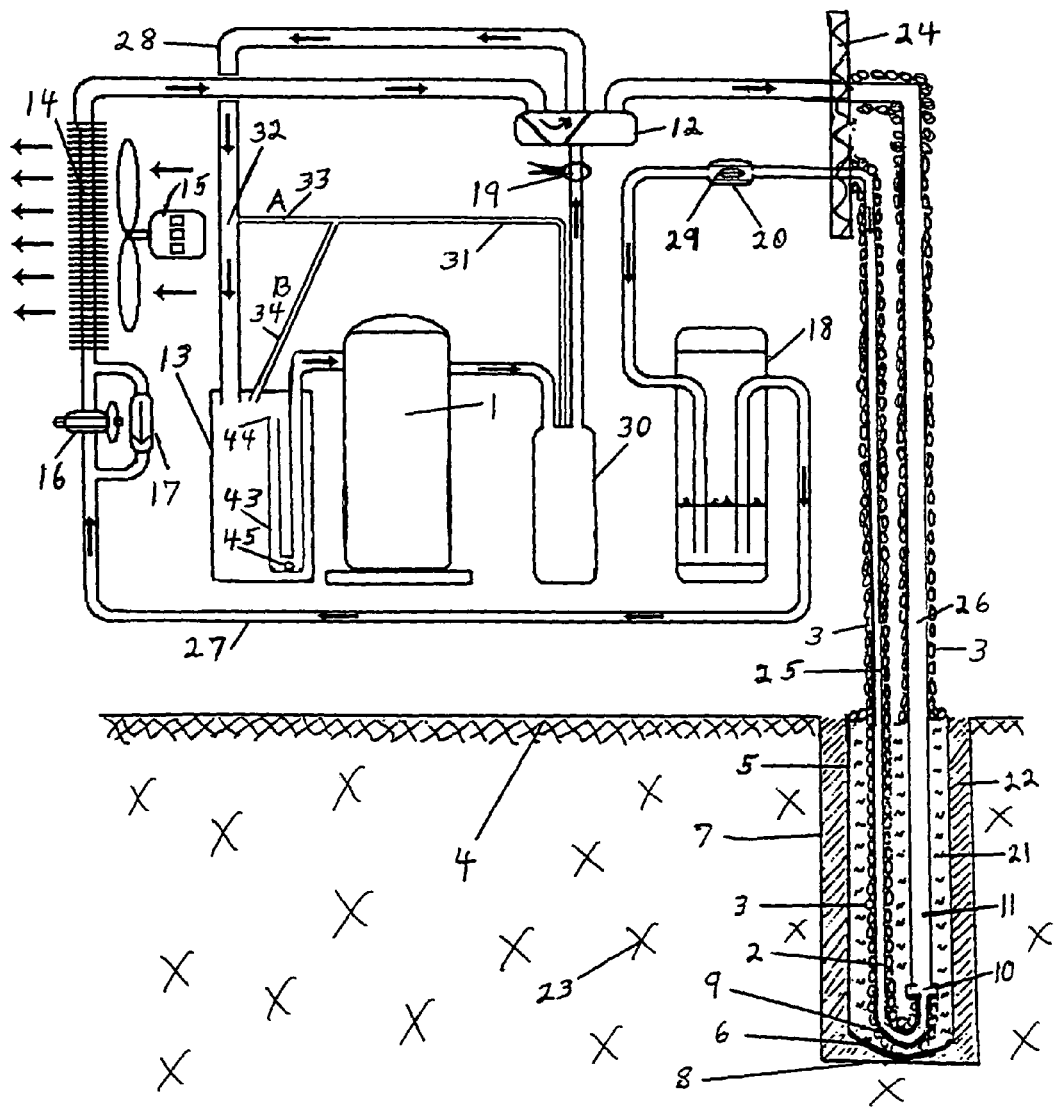
FIG. 1 is a side view of a simple version of a deep well direct expansion geothermal heat pump system, operating in a cooling mode, including smaller diameter sub-surface insulated refrigerant fluid transport tubing coupled, above a U-bend, to larger diameter sub-surface un-insulated refrigerant fluid transport/heat exchange tubing, all situated within a heat conductive fluid-filled watertight pipe in a deep well borehole, and operatively connected, by means of insulated exterior refrigerant fluid transport lines and interior insulated (not shown) refrigerant fluid transport lines, to an interior air heat exchange coil/air handler comprised of finned tubing, which have an adjacent fan to assist in heat transfer to and from interior air. Also shown is a thermal expansion valve for use in the cooling mode with a by-pass for the heating mode, a single piston metering device for use in the heating mode with its own internal by-pass for the cooling mode, an accumulator, a compressor, an oil separator with an oil return line to the refrigerant suction line entering one of the refrigerant vapor suction line and the accumulator, a receiver, and a reversing valve. An optional low pressure cut-off switch is also shown.

Referring now to the drawings in detail, where like numerals refer to like parts or elements, there is shown in FIG. 1 a side view of a simple version of a deep well direct expansion geothermal heat pump system, operating in a cooling mode.

A refrigerant fluid (not shown) is transported, by means of a compressor's 1 force and suction, inside a larger diameter un-insulated sub-surface refrigerant vapor transport/heat exchange line tube 11, which is located below the ground surface 4 within a heat conductive, watertight pipe 5. A smaller diameter sub-surface liquid refrigerant transport line tube 2, which is surrounded by insulation 3, also extends within the heat conductive, watertight pipe 5 all the way to the pipe's sealed lower end/bottom 6, which pipe 5 has been inserted into a deep well borehole 7 all the way to the bottom 8 of the deep well borehole 7. As the sub-surface liquid refrigerant transport tube 2 reaches the sealed pipe bottom 6, the sub-surface liquid tube 2 forms a U-bend 9, which constructively acts as both an oil trap and a liquid refrigerant trap, and the sub-surface liquid tube 2 is thereafter coupled, with a refrigerant tube coupling 10, to the larger diameter un-insulated sub-surface refrigerant vapor transport/heat exchange tube 11. As the refrigerant fluid flows down within the larger diameter un-insulated sub-surface refrigerant transport/heat exchange line tube 11, on its way to the smaller diameter sub-surface liquid refrigerant transport line tube 2, the refrigerant transfers heat into the cooler natural earth 23 geothermal surroundings below the ground surface 4 and is condensed into a cool liquid refrigerant form, as heat always travels to cold.

The cooled refrigerant fluid, which has rejected excessive heat into the earth 23 below the ground surface 4, condenses into a mostly liquid refrigerant form and travels up from the U-bend 9 near/at the sealed pipe's lower end/bottom 6 into an exterior refrigerant transport liquid line tube 25, which is surrounded by insulation 3, through an exterior structure wall 24, and into interior liquid refrigerant transport line tubing 27. The liquid refrigerant then travels around and through the pin restrictor 29 (in the heating mode, which is not shown as the reverse cycle mode of operation is well understood by those skilled in the art, the refrigerant flows in a reverse direction only through the hole in the center of the pin restrictor, and not additionally around the pin, so that the flow of the refrigerant is restricted and metered, as is well understood by those skilled in the art) within the single piston metering device 20, through the receiver 18, which automatically adjusts the optimum amount of refrigerant charge flowing through the system in each of a heating mode and a cooling mode. The refrigerant then flows through the self-adjusting thermal expansion valve 16 (a thermal expansion valve by-pass line 17 is shown, but would only be used in the reverse-cycle heating mode of operation, as is well understood by those skilled in the art), and next through interior located finned heat exchange tubing 14, also commonly called an air handler, with an adjacent fan 15 designed to blow hot interior air over the cooler refrigerant fluid within the finned heat exchange tubing 14 so as enable the cooler refrigerant to absorb and remove excess heat from the interior air.

The warmed refrigerant fluid, having absorbed excessive heat from the interior air, is transformed into a mostly vapor state, and then flows through an interior located reversing valve 12, into an accumulator 13, which catches and stores any liquid refrigerant which has not fully evaporated, and then travels into the compressor 1. The accumulator 13 has an accumulator interior refrigerant vapor suction line 43 which is open at the top 44, so as to help ensure only vapor is pulled into the compressor 1, and has a small hole 45 in the bottom of the accumulator interior refrigerant vapor suction line 43, so as to provide a means for settled and accumulated refrigerant oil to be sucked back into the compressor 1. The compressor 1 compresses the cooler refrigerant vapor into a hot refrigerant gas/vapor. The hot refrigerant vapor then travels, by means of the force of the compressor 1, through the oil separator 30. The oil separator 30 has a small oil return line 31 that returns oil, which has escaped from the compressor 1, to the suction line portion 32 of the interior vapor refrigerant transport line tubing 28, which suction line portion 32 is located prior and proximate to the accumulator 13, by means of oil return line alternate route A 33. In an alternative, the oil could be returned, by means of the oil return line 31, directly into the accumulator 13, as is shown herein by means of oil return line alternate route B 34. The refrigerant fluid then travels through the interior located reversing valve 12, back through the exterior structure wall 24, through the exterior refrigerant transport vapor line tube 26, which is surrounded by insulation 3, and back into the larger diameter un-insulated sub-surface refrigerant vapor transport/heat exchange line tube 11, which is located below the ground surface 4, where the geothermal heat exchange process is repeated.

All above ground surface 4 interior liquid refrigerant transport line tubing 27, and all above ground surface 4 interior vapor refrigerant transport line tubing 28, are fully insulated with rubatex, or the like, as is common in the trade, which is well understood by those skilled in the art and, therefore, is not shown herein.

So as to avoid non-heat conductive air gaps, the remaining interior portion of the heat conductive watertight pipe 5, located below the ground surface 4, is filled with a heat conductive fluid mixture of water and anti-freeze 21. For a similar purpose, the space below the ground surface 4, between the exterior wall of the pipe 5 and the interior wall of the deep well borehole 7, is filled with a heat conductive grout 22, which is in direct thermal contact with the adjacent and surrounding earth 23.

An optional low pressure cut-off switch 19 is also shown for a secondary means of compressor 1 shut-off in the event of a refrigerant leak or other low pressure operational event. If used, the low pressure cut-off switch 19 should be set/designed not to shut off the compressor 1 unless there has been a continuous minimum of 15 minutes of system operation under pressure conditions below the requisite minimum. However, even though shown herein, it is preferably unnecessary to employ the use of a secondary low pressure cut off switch 19, since the compressor's own internal safety cut-off mechanism will shut the compressor off should it become overheated due to an inordinate period of operation under too low of a refrigerant pressure condition. Thus, in a preferable design, the low pressure cut of switch 19 shown here would simply be eliminated.

The operation of a low pressure cut-off switch 19, a compressor 1, an electric powered fan 15, a self-adjusting thermal expansion vale 16, and their requisite and appropriate electrical wiring, as well as the operation of all other system components, are well understood by those skilled in the art and are, therefore, neither shown nor described herein in detail.

Figure 2:
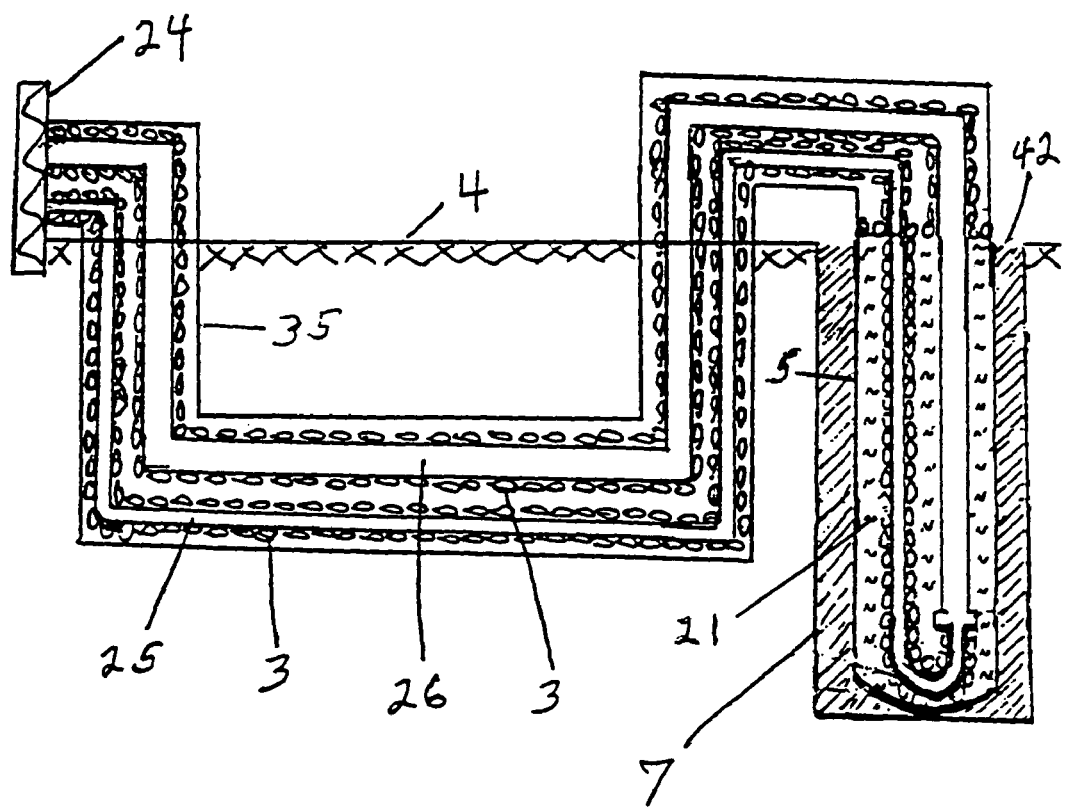
FIG. 2 shows a side view of a direct expansion system exterior refrigerant transport liquid line tube, surrounded by insulation, and of an exterior refrigerant transport vapor line tube, surrounded by insulation, extending from an exterior structure wall, and extending beneath the ground surface, within a protective watertight pipe, to the top of a deep well/borehole at the ground surface.

FIG. 2 shows a side view of a direct expansion system exterior refrigerant transport liquid line tube 25, surrounded by insulation 3, and of an exterior refrigerant transport vapor line tube 26, surrounded by insulation 3, extending from an exterior structure wall 24, and extending beneath the ground surface 4, within a protective watertight pipe 35 (although a protective watertight pipe 35 is shown herein, the refrigerant transport tubing, 25 and 26, including their insulation 3, could, in a similar manner as shown herein, be completely surrounded and encased within Grout Mix 111, which would serve a similar protective purpose) to the top portion 42 of a deep well/borehole 7 at the ground surface 4. Since the exterior refrigerant transport liquid line tube 25, surrounded by insulation 3, and the exterior refrigerant transport vapor line tube 26, surrounded by insulation 3, are not utilized for geothermal heat transfer purposes, the protective watertight pipe 35 within which they are contained is not filled with any heat conductive fill material, as is the heat conductive watertight pipe 5 that extends within the deep well/borehole 7, which is shown as being filled with a mixture of water and anti-freeze 21.

Figure 3:
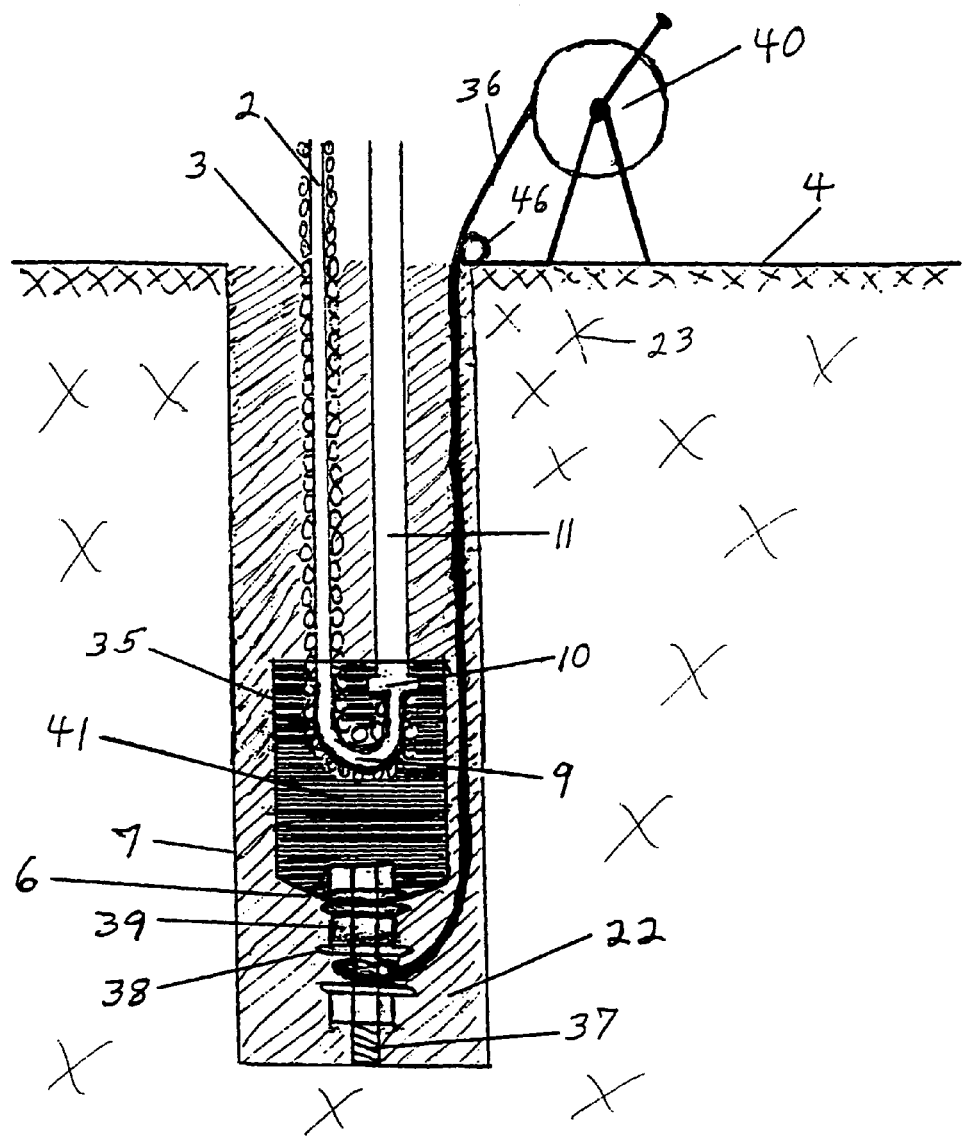
FIG. 3 shows a side view of a deep well/borehole, within which geothermal heat exchange tubing has been lowered by means of a rope. The rope is attached to a steel bolt, which bolt is secured to the bottom a one to three foot pipe segment by means of washers and nuts. The bottom segment of the geothermal heat exchange tubing has been placed within the pipe segment, which has then been filled with a solid grout to form a solid encasement to provide protection to the lower portion of the refrigerant tubing during system installation. The rope extends up through the deep well/borehole, within the heat conductive grout, to a winch located on the ground surface. A small pipe is placed at the edge of the well/borehole to prevent damage to the rope as the assembly is installed.

FIG. 3 shows a side view of a deep well/borehole 7, within which a smaller diameter sub-surface liquid refrigerant transport line tube 2 and a larger diameter un-insulated sub-surface refrigerant vapor transport/heat exchange line tube 11 have been lowered by means of a rope 36. The rope 36 is attached to a steel bolt 37, which bolt 37 is secured to the lower end/bottom 6 of an approximate one to three foot segment of a protective watertight pipe 35, which pipe 35 segment has been filled with a solid encasement 41. The rope 36 is attached around the steel bolt 37, and is secured by means of washers 38 and nuts 39. The rope 36 extends up through the deep well/borehole 7, within the heat conductive grout 22 (the rope will be cut and abandoned upon completion of installation), to a winch 40 located above the ground surface 4.

The liquid line 2 forms a U-bend 9 near the pipe's 35 lower end/bottom 6, and then connects, by means of a refrigerant tube coupling 10, to the larger diameter un-insulated sub-surface refrigerant vapor transport/heat exchange line tube 11. The lower one to three feet of this assembly are shown as being situated within a solid encasement 41 inside of a pipe 35. The solid encasement 41 is comprised of Grout Mix 111, or the like, which fills the remaining area within the one to three foot pipe 35 segment after insertion of the U-bend 9 segment, so as to protect the lower U-bend 9 of the copper tubing assembly during system installation, and so as to prevent bending/crimping of the copper lines, 2 and 11, proximate to the U-bend 9 because of the weight of the copper lines, 2 and 11, which extend all the way to a point above the ground surface 4. The pipe 35 segment extends from the pipe's 35 lower end/bottom 6 to a point just above the refrigerant tube coupling 10. Only solid encasement 41 is shown between the steel bolt 37 and the U-bend 9 in the liquid line 2, so as to provide an electrical transfer/corrosive barrier between the steel bolt 37 and the liquid refrigerant transport line 2, which is typically composed of copper. The remaining interior portion of the well/borehole 7 is filled with a heat conductive grout 22, such as a preferable Grout Mix 111, so as to totally encase and seal the larger diameter un-insulated sub-surface refrigerant vapor transport/heat exchange line tube 11, the smaller diameter sub-surface liquid refrigerant transport line tube 2, including its insulation 3, the copper tube U-bend 9, and the refrigerant tubing coupling 10, as well as the lower solid encasement 41 and pipe 35 segment, thereby protecting all of them from potentially corrosive surrounding soil conditions.

A small rigid pipe 46 is shown on the ground surface 4, adjacent to the edge of the well/borehole 7, so as to provide a means for the rope 36 to be fed and guided down into the well/borehole 7 without chaffing the rope, and without the rope digging into the surrounding earth 23.

Figure 4:
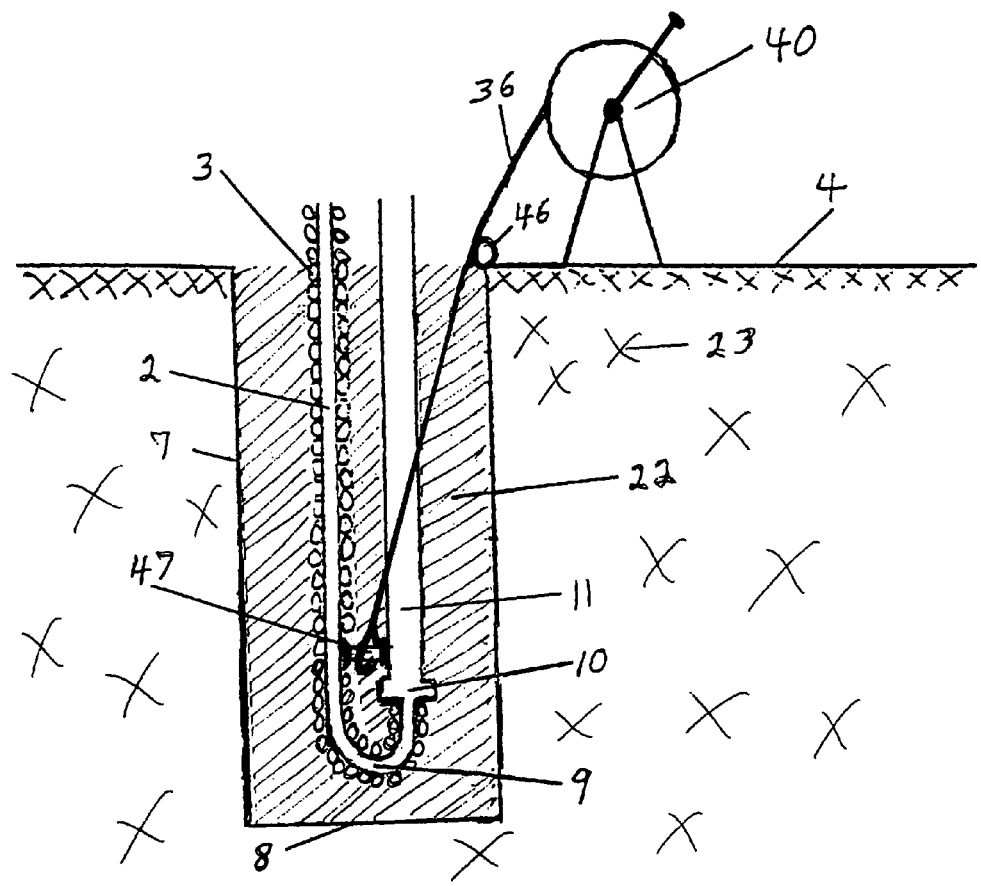
FIG. 4 shows a side view of a deep well/borehole, within which a smaller diameter sub-surface liquid refrigerant transport line tube and a larger diameter un-insulated sub-surface refrigerant vapor transport/heat exchange line tube have been lowered by means of a rope. The rope is attached around a small rigid copper pipe, which has been silver soldered between the smaller diameter sub-surface liquid refrigerant transport line tube and the larger diameter un-insulated sub-surface refrigerant vapor transport/heat exchange line tube, about two inches above the refrigerant tube coupling that couples the liquid line tube with the vapor line tube. The rope, which will be cut and abandoned upon completion of installation, extends up through the deep well/borehole, within the heat conductive grout, to a winch located above the ground surface. The liquid line forms a U-bend near, but not at, the bottom of the well/borehole, so as to leave room for the heat conductive grout to totally surround and seal the U-bend, all the sub-surface refrigerant lines, the sub-surface insulation, and the coupling, so as to provide protection from corrosive elements. A small pipe is placed at the edge of the well/borehole to prevent damage to the rope as the assembly is installed.

FIG. 4 shows a side view of a deep well/borehole 7, within which a smaller diameter sub-surface liquid refrigerant transport line tube 2, surrounded by insulation 3, and a larger diameter un-insulated sub-surface refrigerant vapor transport/heat exchange line tube 11 have been lowered by means of a rope 36.

The rope 36 is attached around a small rigid copper pipe/bar 47, which has been silver soldered between the smaller diameter sub-surface liquid refrigerant transport line tube 2 and the larger diameter un-insulated sub-surface refrigerant vapor transport/heat exchange line tube 11, about two inches above the refrigerant tube coupling 10 that couples the liquid line tube 2 with the vapor line tube 11.

The rope 36 extends up through the deep well/borehole 7, within the heat conductive grout 22 (the rope will be cut and abandoned upon completion of installation), to a winch 40 located above the ground surface 4.

The liquid line 2 forms a U-bend 9 near, but not at, the bottom 8 of the well/borehole 7, so as to leave room for the heat conductive grout 22 to totally surround and seal the U-bend 9 and its insulation 3.

The remaining interior portion of the well/borehole 7 is filled with a heat conductive grout 22, such as a preferable Grout Mix 111, so as to totally encase and seal the larger diameter un-insulated sub-surface refrigerant vapor transport/heat exchange line tube 11, the smaller diameter sub-surface liquid refrigerant transport line tube 2, including its insulation 3, the copper tube U-bend 9, and the refrigerant tubing coupling 10, thereby protecting all of them from potentially corrosive surrounding soil conditions.

A small rigid pipe 46 is shown on the ground surface 4, adjacent to the edge of the well/borehole 7, so as to provide a means for the rope 36 to be fed and guided down into the well/borehole 7 without chaffing the rope, and without the rope digging into the surrounding earth 23.

Figure 5:
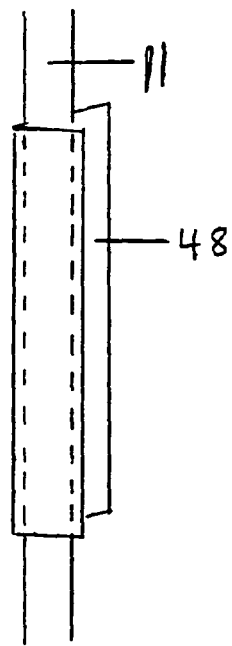
FIG. 5 shows a side view of a larger diameter un-insulated sub-surface refrigerant vapor transport/heat exchange line tube, which is being protected from sub-surface corrosive elements by means of the application of a protective layer of a protective coating. Such a temporary protective coating will help to guard the copper refrigerant tube against damage until a protective encasement of Grout Mix 111 can be supplied once the copper tube is lowered into a borehole.

FIG. 5 shows a side view of a larger diameter un-insulated sub-surface refrigerant vapor transport/heat exchange line tube 11, which is being protected from sub-surface corrosive elements by means of the application of a protective layer of a protective coating 48, comprised of shrink wrap or the like. Such a temporary protective coating 48 will help to guard the copper refrigerant tube 11 against damage until a protective encasement of Grout Mix 111 (not shown herein) can be supplied once the copper tube 11 is lowered into a borehole (not shown herein). While a wrapping of one segment of the tube 11 is shown, it should be understood that all of the sub-surface tubing 11 would be wrapped in a protective coating 48 prior to the tubing's 11 introduction into a well/borehole.

Figure 6:
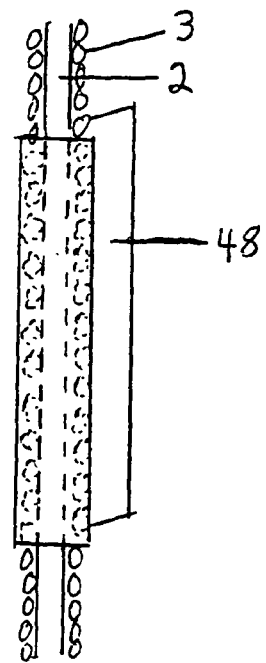
FIG. 6 shows a side view of a smaller diameter sub-surface liquid refrigerant transport line tube, surrounded by insulation, which is all being protected from sub-surface corrosive elements by means of the application of a protective layer of a protective coating. Such a temporary protective coating will help to guard the copper refrigerant tube and its insulation against damage until a protective encasement can be supplied once the insulated copper tube is lowered into a borehole.

FIG. 6 shows a side view of a smaller diameter sub-surface liquid refrigerant transport line tube 2, surrounded by insulation 3, which is all being protected from sub-surface corrosive elements by means of the application of a protective layer of a protective coating 48, comprised of shrink wrap or the like. Such a temporary protective coating 48 will help to guard the copper refrigerant tube 11 and its insulation 3 against damage until a protective encasement of Grout Mix 111 (not shown herein) can be supplied once the insulated 3 copper tube 11 is lowered into a borehole (not shown herein). While a wrapping of one segment of the tube 2 and its insulation 3 is shown, it should be understood that all of the sub-surface tubing 2 and all of its sub-surface insulation 3 would be wrapped in a protective coating 48 prior to the tubing's 2 and its insulation's 3 introduction into a well/borehole.

Although particular embodiments of a system and method to enhance the operational efficiencies and installation efficiencies and cost functionality of direct expansion geothermal heat exchange installations are described, it is not intended that such description be construed as limiting the scope of this invention, except as set forth in the following claims:

What is claimed is:

1. A method of designing a direct expansion geothermal heat exchange system having a heating mode and a cooling mode, the method comprising:
providing an interior air heat exchanger;
providing an exterior, subterranean heat exchanger;
charging the system with a refrigerant so that the refrigerant has a head pressure in the cooling mode of approximately 305-405 psi, and a suction pressure in the heating mode of approximately 80-160 psi.

2. The method of claim 1, further comprising providing an R-410A refrigerant.

3. The method of claim 1, further comprising providing a polyolester oil in the direct expansion system.

4. The method of claim 1, further comprising providing a single piston metering device in the heating mode, with a pin restrictor (Aeroquip type) sizing as follows, based on central hole bore size in inches, utilized, plus or minus a maximum of two (2) one thousandths of an inch (0.001) central hole bore size, within the following depth ranges:

Maximum Heating Tonnage Design . . . Pin Restrictor Central Bore Hole Size in Inches

*0 to 50 feet (depth of borehole below compressor unit)

| | |
|---|---|
| 1.5 | 0.041 |
| 2 | 0.049 |
| 2.5 | 0.055 |
| 3 | 0.059 |
| 3.5 | 0.063 |
| 4 | 0.065 |
| 4.5 | 0.068 |
| 5 | 0.071 |

*51 to 175 feet (depth of borehole below compressor unit)

| | |
|---|---|
| 1.5 | 0.039 |
| 2 | 0.047 |
| 2.5 | 0.052 |
| 3 | 0.056 |
| 3.5 | 0.060 |
| 4 | 0.062 |
| 4.5 | 0.065 |
| 5 | 0.067 |

*176 to 300 feet (depth of borehole below compressor unit)

| | |
|---|---|
| 1.5 | 0.037 |
| 2 | 0.044 |
| 2.5 | 0.050 |
| 3 | 0.053 |
| 3.5 | 0.057 |
| 4 | 0.059 |
| 4.5 | 0.061 |
| 5 | 0.064; |

5. The method of claim 1, further comprising providing, in the cooling mode, a self-adjusting thermostatic expansion valve which is located proximate to the interior heat exchanger and is sized at 140%, plus or minus 10% of 100%, of a maximum compressor tonnage design capacity in the cooling mode;
providing a single piston metering device situated proximate to the interior heat exchanger in the cooling mode, with a pin restrictor (Aeroquip type) sizing as follows, based on central hole bore size in inches, utilized, plus or minus a maximum of two (2) one thousandths of an inch (0.001) central hole bore size, within the following depth ranges:

Maximum Cooling Tonnage Design—Pin Restrictor Size in Inches

*0 to 50 feet (height of interior air handler above the compressor unit)

| | |
|---|---|
| 1.5 | 0.058 |
| 2 | 0.070 |
| 2.5 | 0.077 |
| 3 | 0.085 |
| 3.5 | 0.093 |
| 4 | 0.099 |
| 4.5 | 0.100 |
| 5 | 0.112; |

6. The method of claim 1, in which charging the system further includes obtaining a peak operational efficiency in the cooling mode with a superheat of approximately 10 to 25 degrees F., a head pressure in the heating mode of approximately 195 to 275 PSI, a suction pressure in the cooling mode of approximately 80 to 160 PSI, and a suction/vapor temperature of approximately 37 to 55 degree degrees F.

7. A direct expansion geothermal heat exchange system having a heating mode and a cooling mode, the system comprising;
an interior air heat exchanger;
an exterior, subterranean heat exchanger; and
a refrigerant disposed in the system and sufficiently charged to have a head pressure in the cooling mode of approximately 305-405 psi, and a suction pressure in the heating mode of approximately 80-160 psi.

8. The system of claim 7, in which the refrigerant comprises an R-410A refrigerant.

9. The system of claim 7, further comprising a polyolester oil in the direct expansion system.

10. The system of claim 7, further comprising a single piston metering device in the heating mode, with a pin restrictor (Aeroquip type) sizing as follows, based on central hole bore size in inches, utilized, plus or minus a maximum of two (2) one thousandths of an inch (0.001) central hole bore size, within the following depth ranges:

Maximum Heating Tonnage Design . . . Pin Restrictor Central Bore Hole Size in Inches

*0 to 50 feet (depth of borehole below compressor unit)

| | |
|---|---|
| 1.5 | 0.041 |
| 2 | 0.049 |
| 2.5 | 0.055 |
| 3 | 0.059 |
| 3.5 | 0.063 |

-continued

| | |
|---|---|
| 4 | 0.065 |
| 4.5 | 0.068 |
| 5 | 0.071 |

*51 to 175 feet (depth of borehole below compressor unit)

| | |
|---|---|
| 1.5 | 0.039 |
| 2 | 0.047 |
| 2.5 | 0.052 |
| 3 | 0.056 |
| 3.5 | 0.060 |
| 4 | 0.062 |
| 4.5 | 0.065 |
| 5 | 0.067 |

*176 to 300 feet (depth of borehole below compressor unit)

| | |
|---|---|
| 1.5 | 0.037 |
| 2 | 0.044 |
| 2.5 | 0.050 |
| 3 | 0.053 |
| 3.5 | 0.057 |
| 4 | 0.059 |
| 4.5 | 0.061 |
| 5 | 0.064; |

11. The system of claim 7, further comprising, in the cooling mode, a self-adjusting thermostatic expansion valve which is located proximate to the interior heat exchanger and is sized at 140%, plus or minus 10% of 100%, of a maximum compressor tonnage design capacity in the cooling mode;

providing a single piston metering device situated proximate to the interior heat exchanger in the cooling mode, with a pin restrictor (Aeroquip type) sizing as follows, based on central hole bore size in inches, utilized, plus or minus a maximum of two (2) one thousandths of an inch (0.001) central hole bore size, within the following depth ranges:

Maximum Cooling Tonnage Design—Pin Restrictor Size in Inches

*0 to 50 feet (height of interior air handler above the compressor unit)

| | |
|---|---|
| 1.5 | 0.058 |
| 2 | 0.070 |
| 2.5 | 0.077 |
| 3 | 0.085 |
| 3.5 | 0.093 |
| 4 | 0.099 |
| 4.5 | 0.100 |
| 5 | 0.112; |

12. The system of claim 7, further comprising charging the system with the refrigerant to obtain a peak operational efficiency in the cooling mode with a superheat of approximately 10 to 25 degrees F., a head pressure in the heating mode of approximately 195 to 275 PSI, a suction pressure in the cooling mode of approximately 80 to 160 PSI, and a suction/vapor temperature of approximately 37 to 55 degrees F.

13. A method of designing a direct expansion geothermal heat exchange system having a cooling mode and a heating mode, the method comprising:

providing an R-410A refrigerant; and providing a single piston metering device in the heating mode, with a pin restrictor (Aeroquip type) sizing as follows, based on central hole bore size in inches, utilized, plus or minus a maximum of two (2) one thousandths of an inch (0.001) central hole bore size, within the following depth ranges:

| Maximum Heating Tonnage Design | Pin Restrictor Central Bore Hole Size in Inches |
|---|---|
| *0 to 50 feet (depth of borehole below compressor unit) | |
| 1.5 | 0.041 |
| 2 | 0.049 |
| 2.5 | 0.055 |
| 3 | 0.059 |
| 3.5 | 0.063 |
| 4 | 0.065 |
| 4.5 | 0.068 |
| 5 | 0.071 |
| *51 to 175 feet (depth of borehole below compressor unit) | |
| 1.5 | 0.039 |
| 2 | 0.047 |
| 2.5 | 0.052 |
| 3 | 0.056 |
| 3.5 | 0.060 |
| 4 | 0.062 |
| 4.5 | 0.065 |
| 5 | 0.067 |
| *176 to 300 feet (depth of borehole below compressor unit) | |
| 1.5 | 0.037 |
| 2 | 0.044 |
| 2.5 | 0.050 |
| 3 | 0.053 |
| 3.5 | 0.057 |
| 4 | 0.059 |
| 4.5 | 0.061 |
| 5 | 0.064. |

14. A method of designing a direct expansion geothermal heat exchange system having a cooling mode and a heating mode, the method comprising:

providing an R-410A refrigerant; and charging the system with the refrigerant to obtain a peak operational efficiency in the cooling mode with a superheat of approximately 10 to 25 degrees F., a head pressure in the heating mode of approximately 195 to 275 PSI, a suction pressure in the cooling mode of approximately 80 to 160 PSI, and a suction/vapor temperature of approximately 37 to 55 degrees F.

15. A method of designing a direct expansion geothermal heat exchange system having a cooling mode and a heating mode, the method comprising:

providing a refrigerant with heating/cooling operational working pressures between 80 psi and 405 psi; and providing a single piston metering device in the heating mode, with a pin restrictor (Aeroquip type) sizing, based on central hole bore size in inches, utilized, plus or minus a maximum of two (2) one thousandths of an inch (0.001) central hole bore size, within the following depth ranges:

| Maximum Heating Tonnage Design | Pin Restrictor Central Bore Hole Size in Inches |
|---|---|
| *0 to 50 feet (depth of borehole below compressor unit) | |
| 1.5 | 0.041 |
| 2 | 0.049 |
| 2.5 | 0.055 |
| 3 | 0.059 |
| 3.5 | 0.063 |
| 4 | 0.065 |
| 4.5 | 0.068 |
| 5 | 0.071 |
| *51 to 175 feet (depth of borehole below compressor unit) | |
| 1.5 | 0.039 |
| 2 | 0.047 |
| 2.5 | 0.052 |
| 3 | 0.056 |
| 3.5 | 0.060 |
| 4 | 0.062 |
| 4.5 | 0.065 |
| 5 | 0.067 |
| *176 to 300 feet (depth of borehole below compressor unit) | |
| 1.5 | 0.037 |
| 2 | 0.044 |
| 2.5 | 0.050 |
| 3 | 0.053 |
| 3.5 | 0.057 |
| 4 | 0.059 |
| 4.5 | 0.061 |
| 5 | 0.064. |

16. A method of designing a direct expansion geothermal heat exchange system having a cooling mode and a heating mode, the method comprising:

providing a refrigerant with heating/cooling operational working pressures between 80 psi and 405 psi; and charging the system with the refrigerant to obtain a peak operational efficiency in the cooling mode with a superheat of approximately 10 to 25 degrees F., a head pressure in the heating mode of approximately 195 to 275 PSI, a suction pressure in the cooling mode of approximately 80 to 160 PSI, and a suction/vapor temperature of approximately 37 to 55 degrees F.

17. A method of designing a direct expansion geothermal heat exchange system having a cooling mode and a heating mode, the method comprising:

providing an interior air heat exchanger;

providing an exterior, subterranean heat exchanger, the exterior heat exchanger including heat exchange tubing, at least a portion of the heat exchange tubing having a subterranean depth of approximately 100-300 feet; and charging the system with an R-410A refrigerant until the refrigerant has a head pressure in the cooling mode of approximately 305-405 psi, and a suction pressure in the heating mode of approximately 80-160 psi.

18. A direct expansion geothermal heat exchange system having a cooling mode and a heating mode, the system comprising:

an interior air heat exchanger;

an exterior, subterranean heat exchanger, the exterior heat exchanger including heat exchange tubing, at least a portion of the heat exchange tubing having a subterranean depth of approximately 100-300 feet; and an R-410A refrigerant disposed in the system, the R-410A refrigerant having a charge sufficient to obtain a head pressure in the cooling mode of approximately 305-405 psi, and a suction pressure in the heating mode of approximately 80-160 psi.

* * * * *